Figure 1:
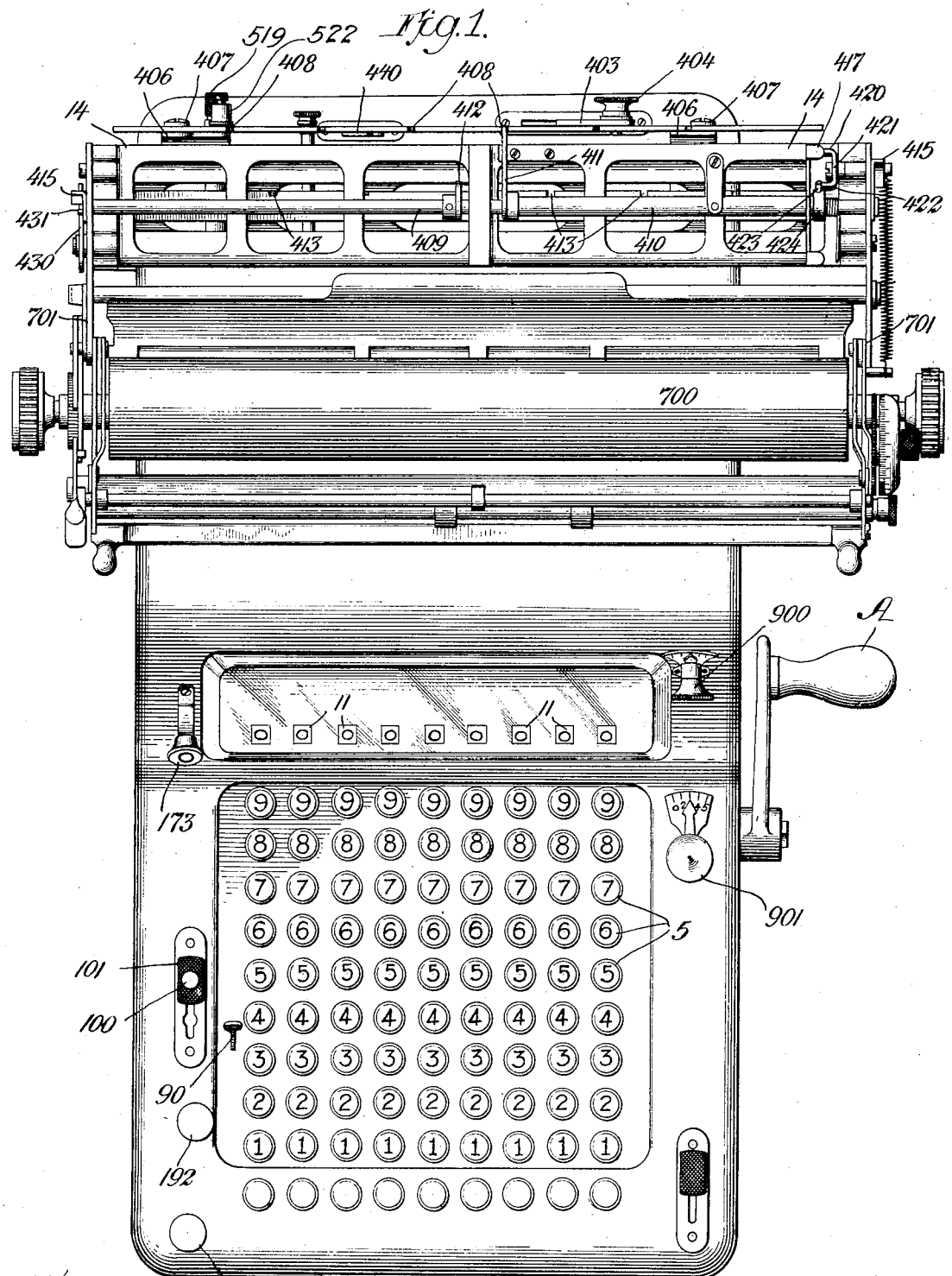

F. C. RINSCHE.
ADDING AND LISTING MACHINE.
APPLICATION FILED OCT. 7, 1909.

1,114,914.

Patented Oct. 27, 1914.
20 SHEETS—SHEET 1.

F. C. RINSCHE.
ADDING AND LISTING MACHINE.
APPLICATION FILED OCT. 7, 1909.
1,114,914.
Patented Oct. 27, 1914.
20 SHEETS—SHEET 6.
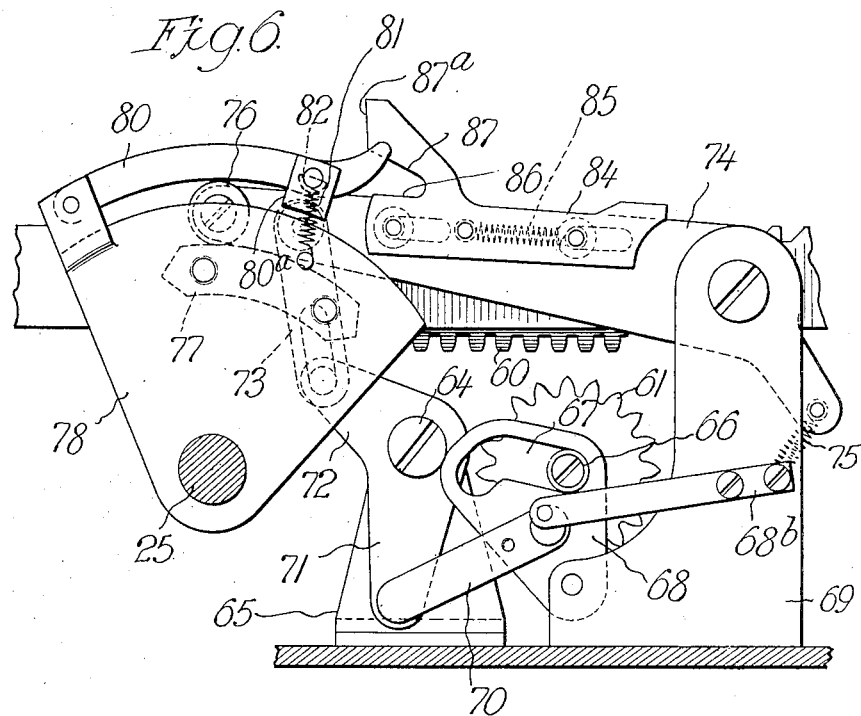
Fig. 6.
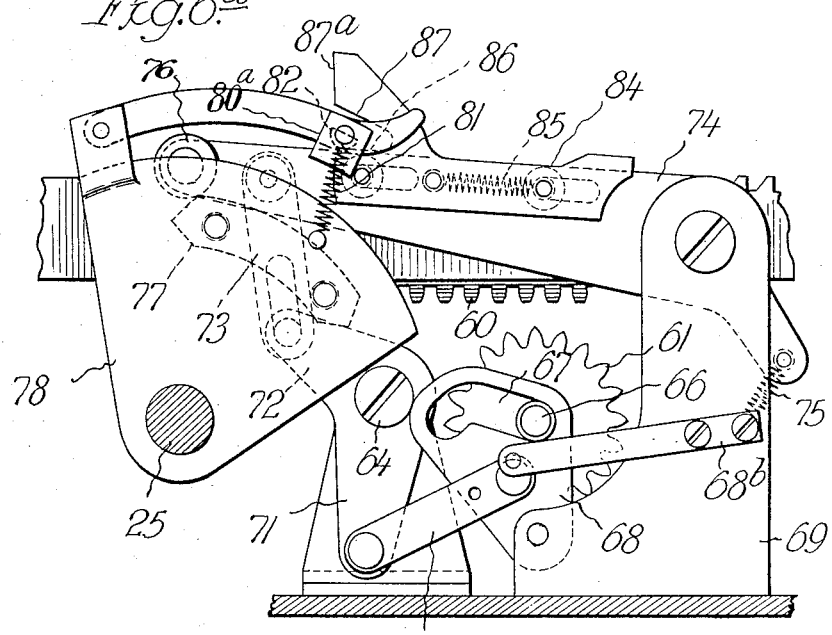
Fig. 6.ª
Witnesses:
E. R. Barrett.
Robert Dobberman.
Inventor
Frank C. Rinsche
by Rector Hibben Davis
his Atty's

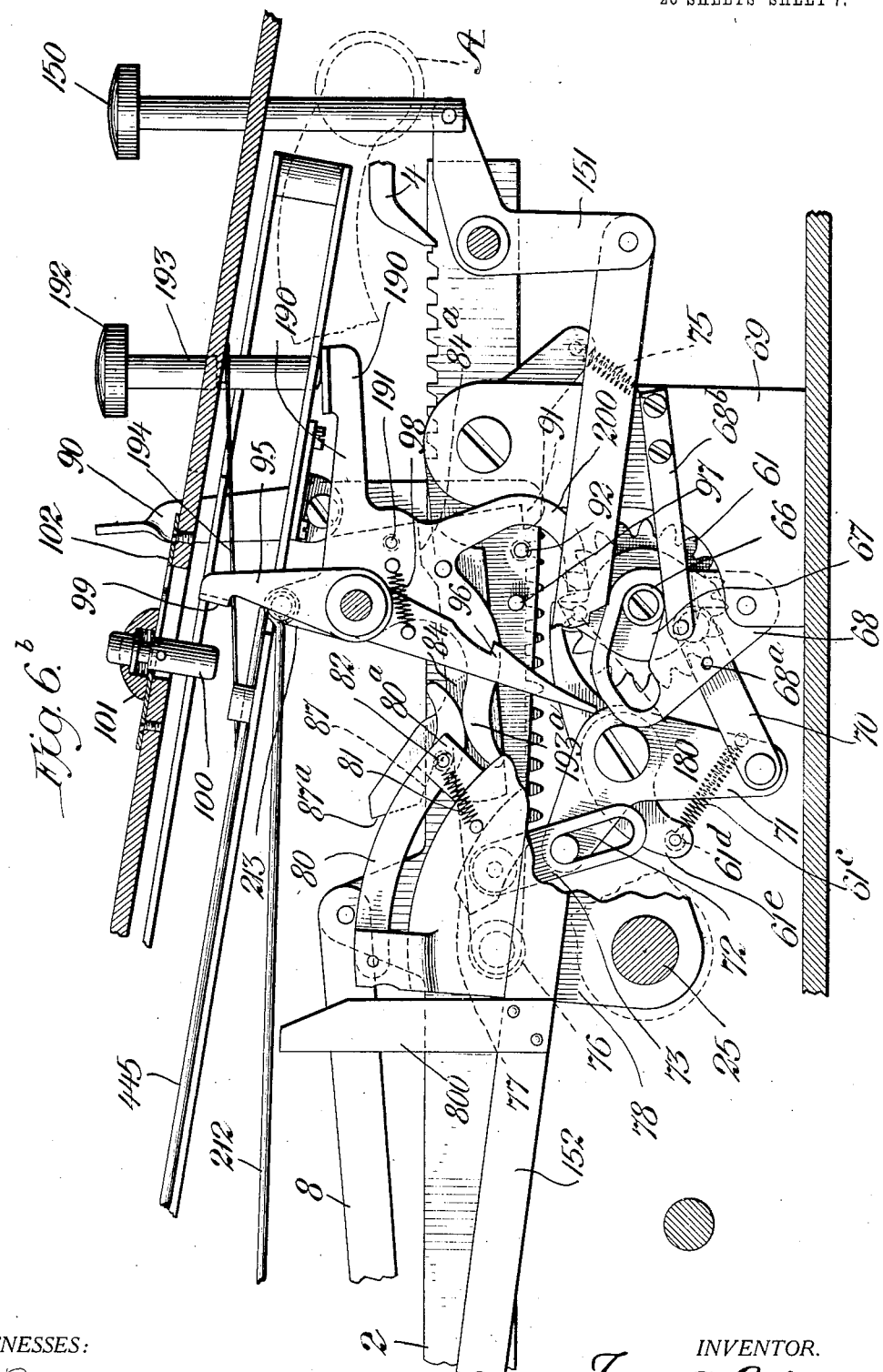

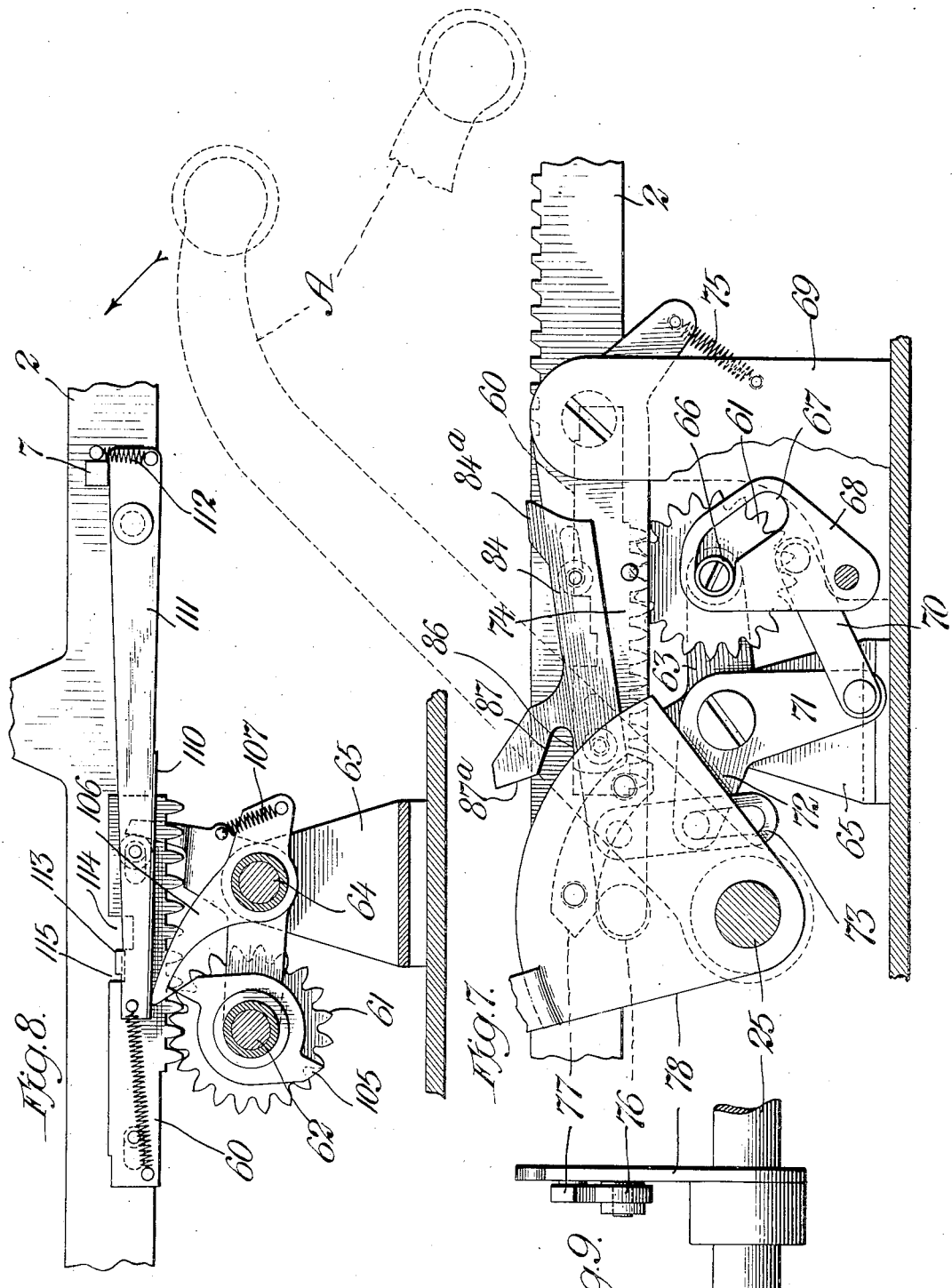

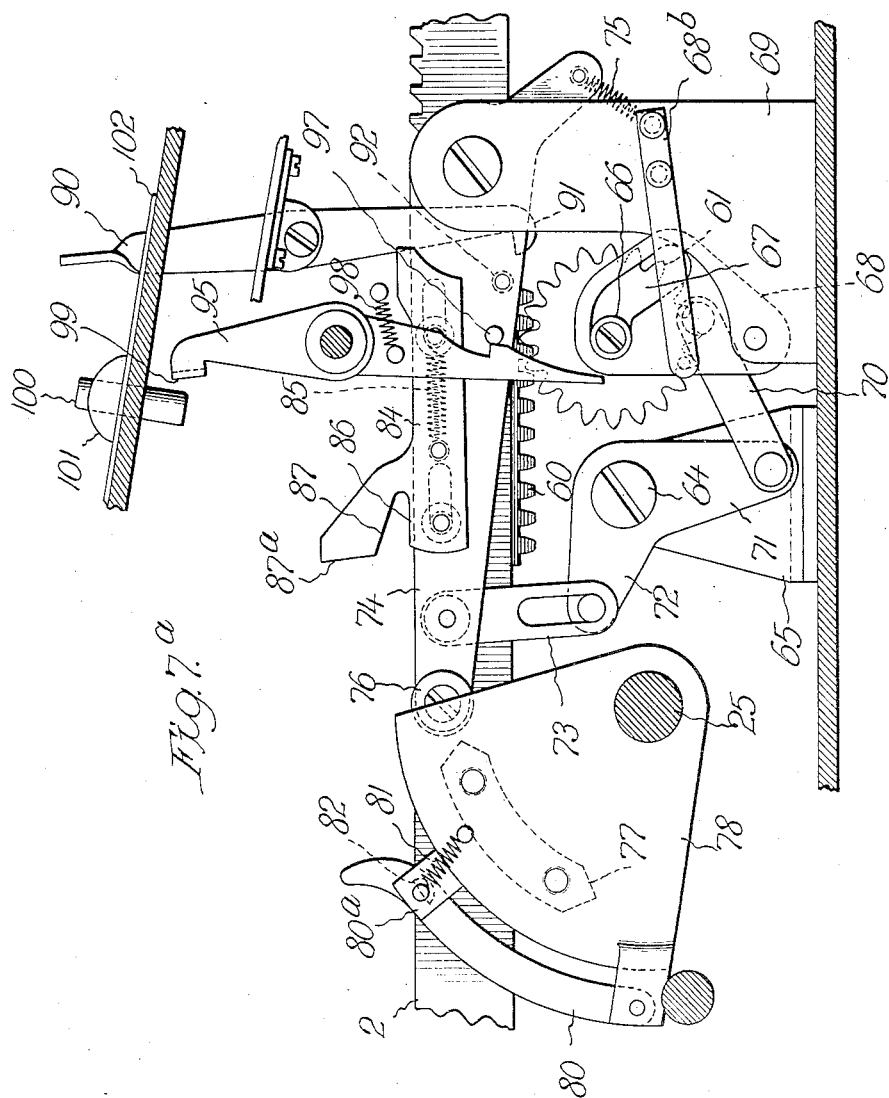

F. C. RINSCHE.
ADDING AND LISTING MACHINE.
APPLICATION FILED OCT. 7, 1909.
1,114,914.
Patented Oct. 27, 1914.
20 SHEETS—SHEET 10.
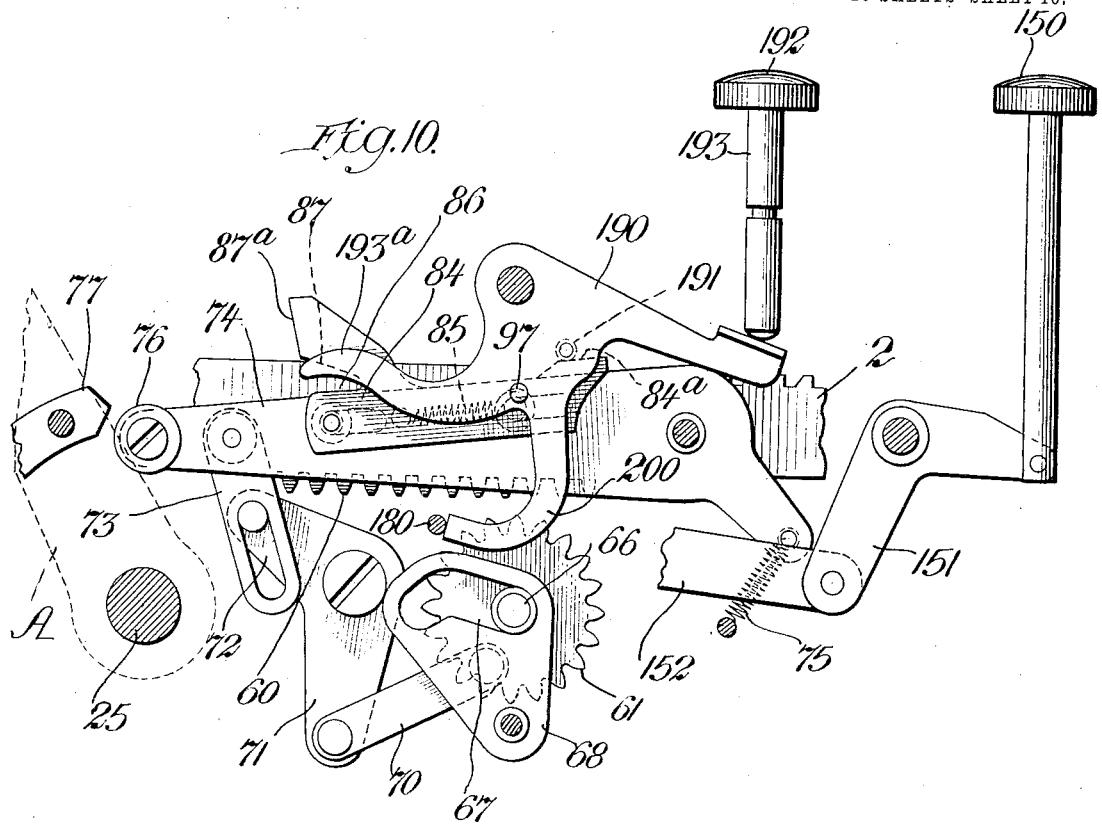
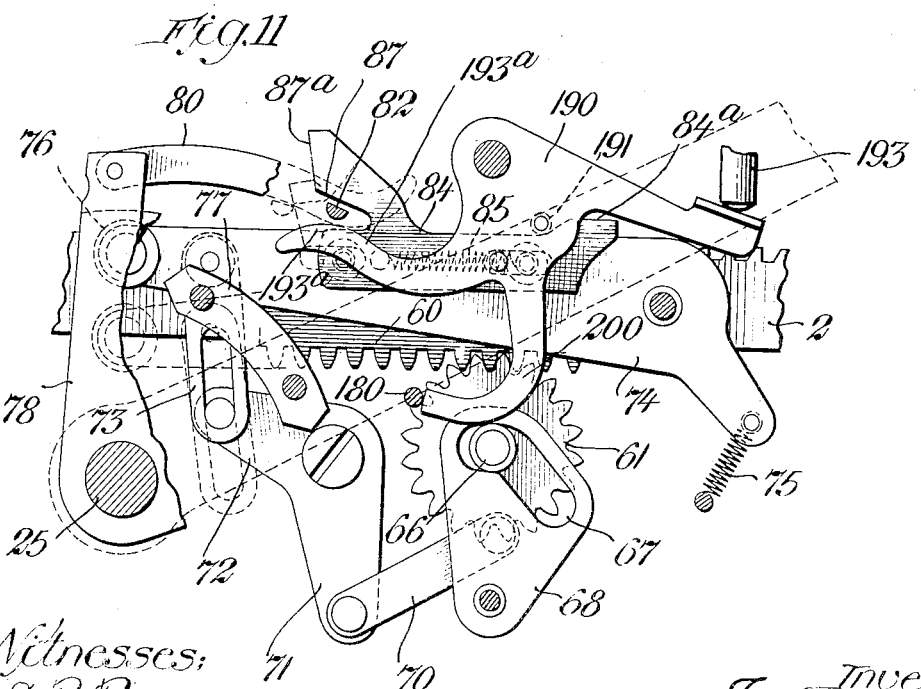
Witnesses:
E. R. Barrett
Louis B. Erwin
Inventor
Frank C. Rinsche
Rector Hibben Davis
his Atty's.

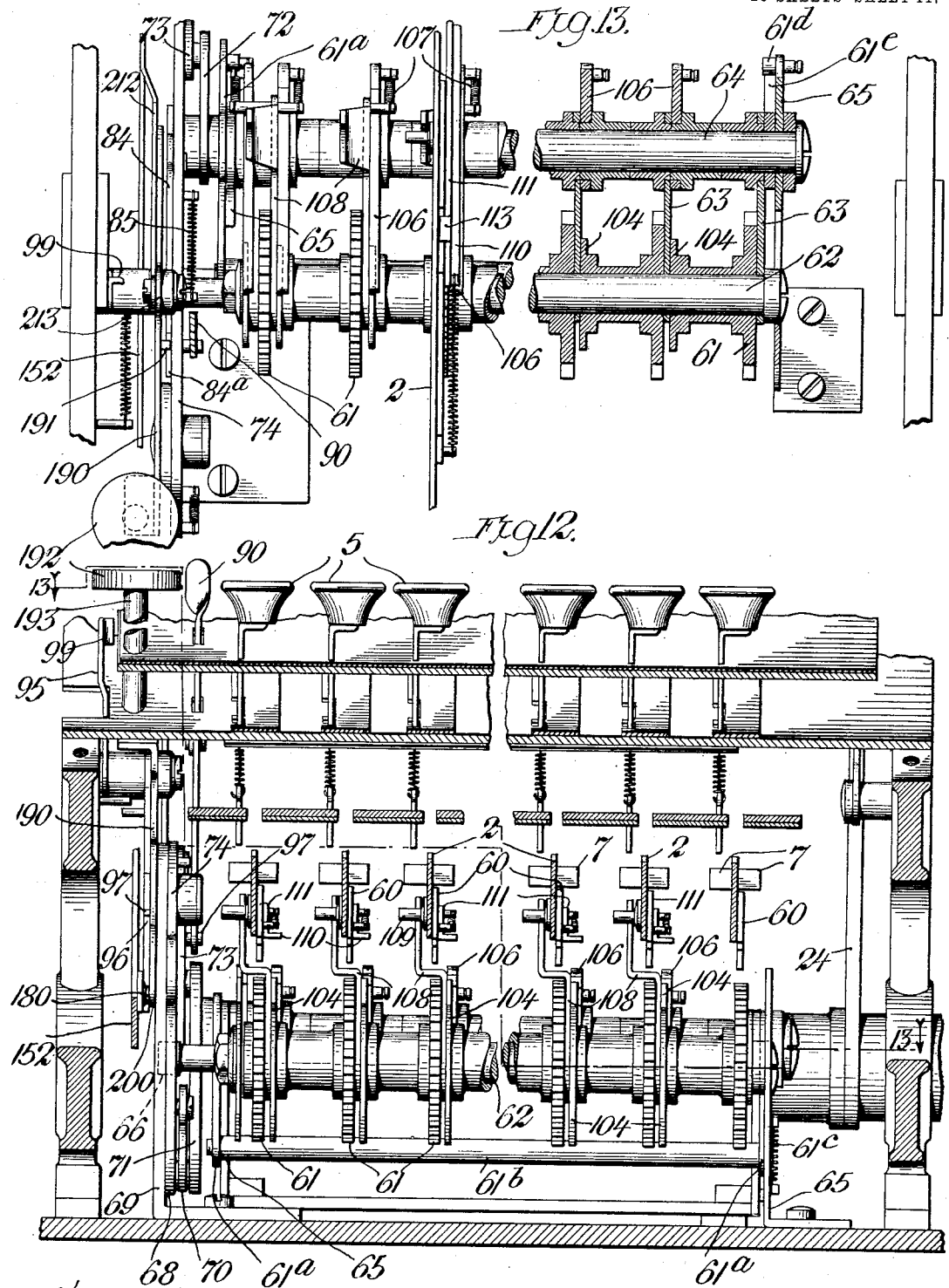

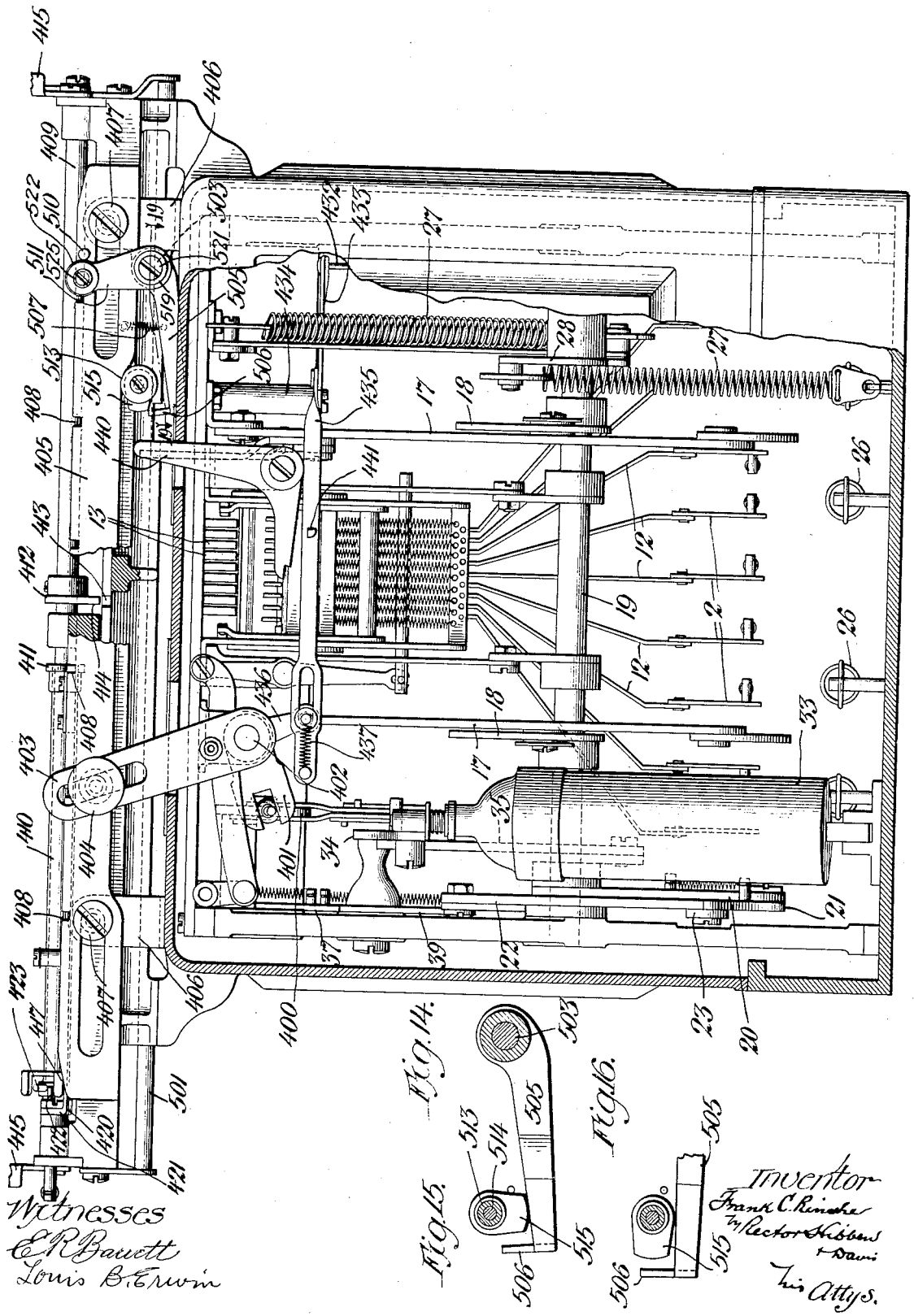

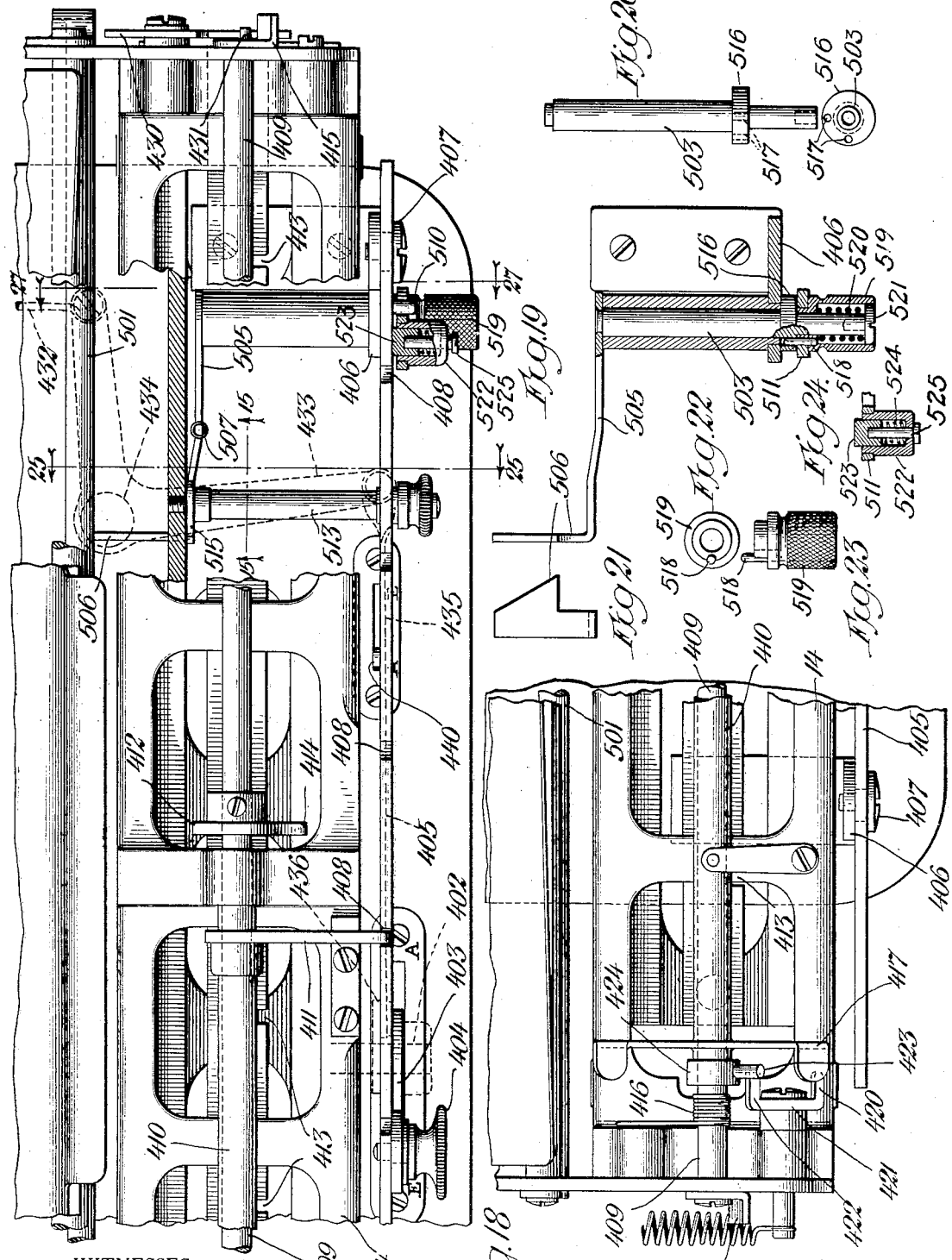

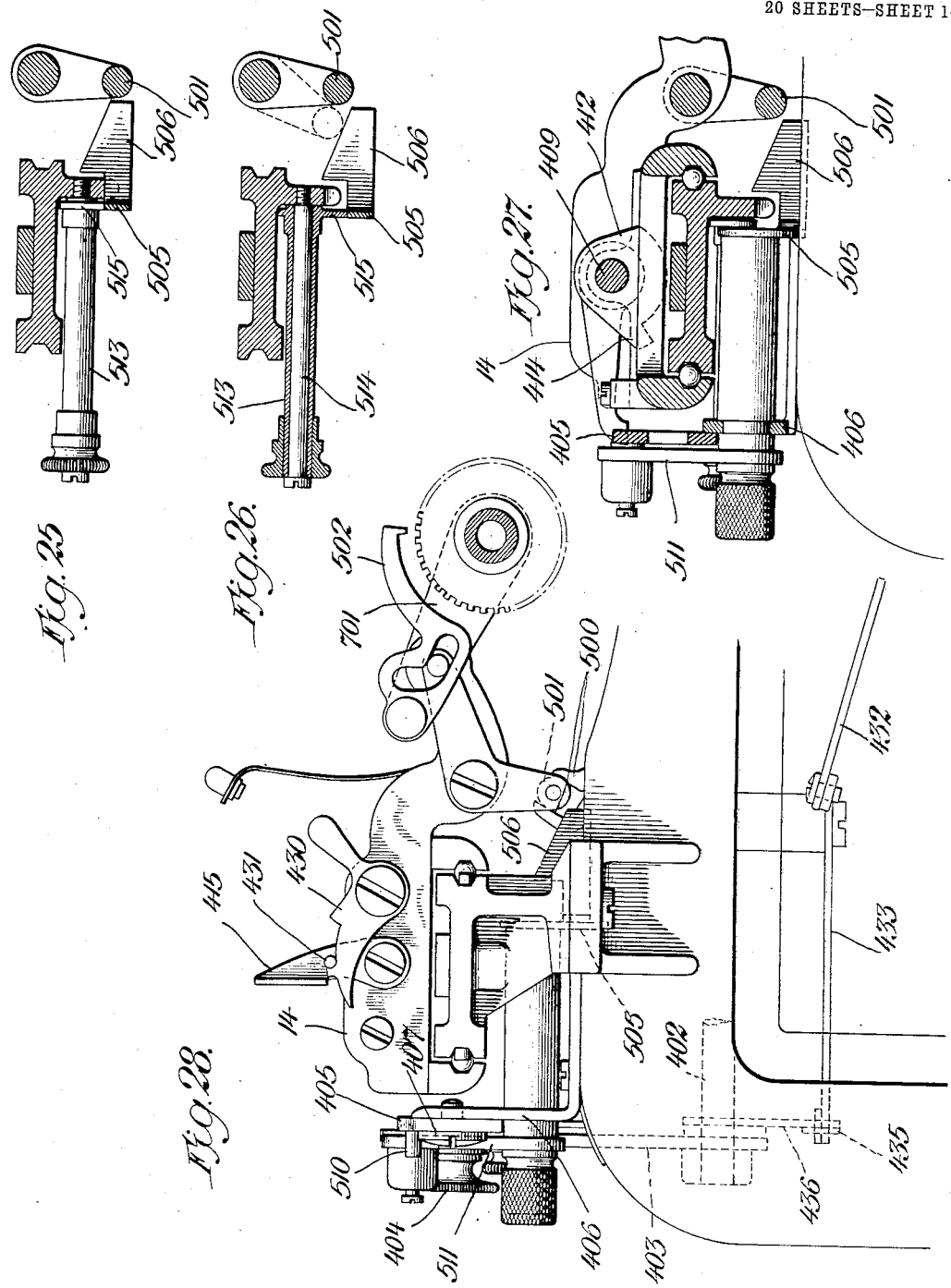

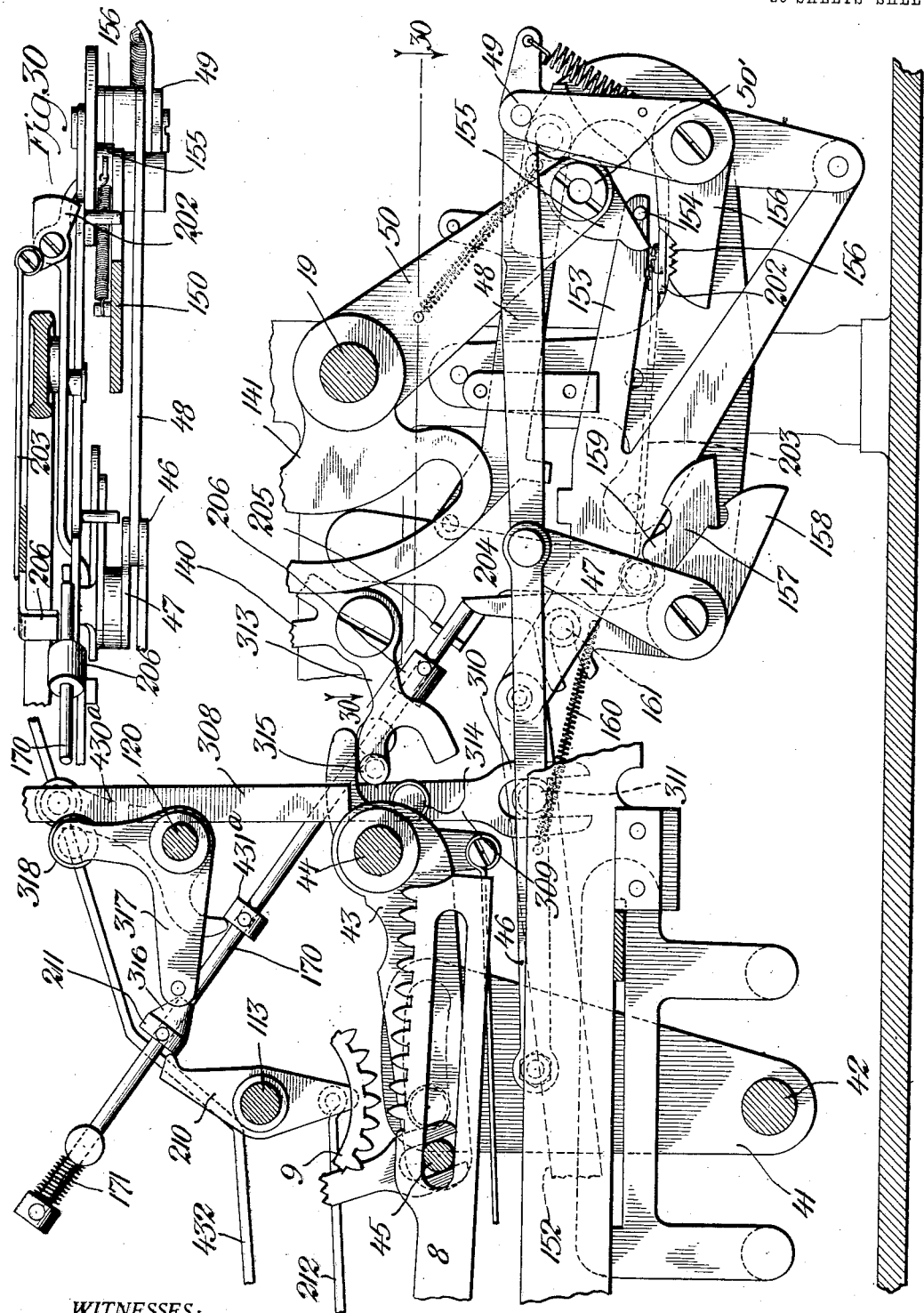

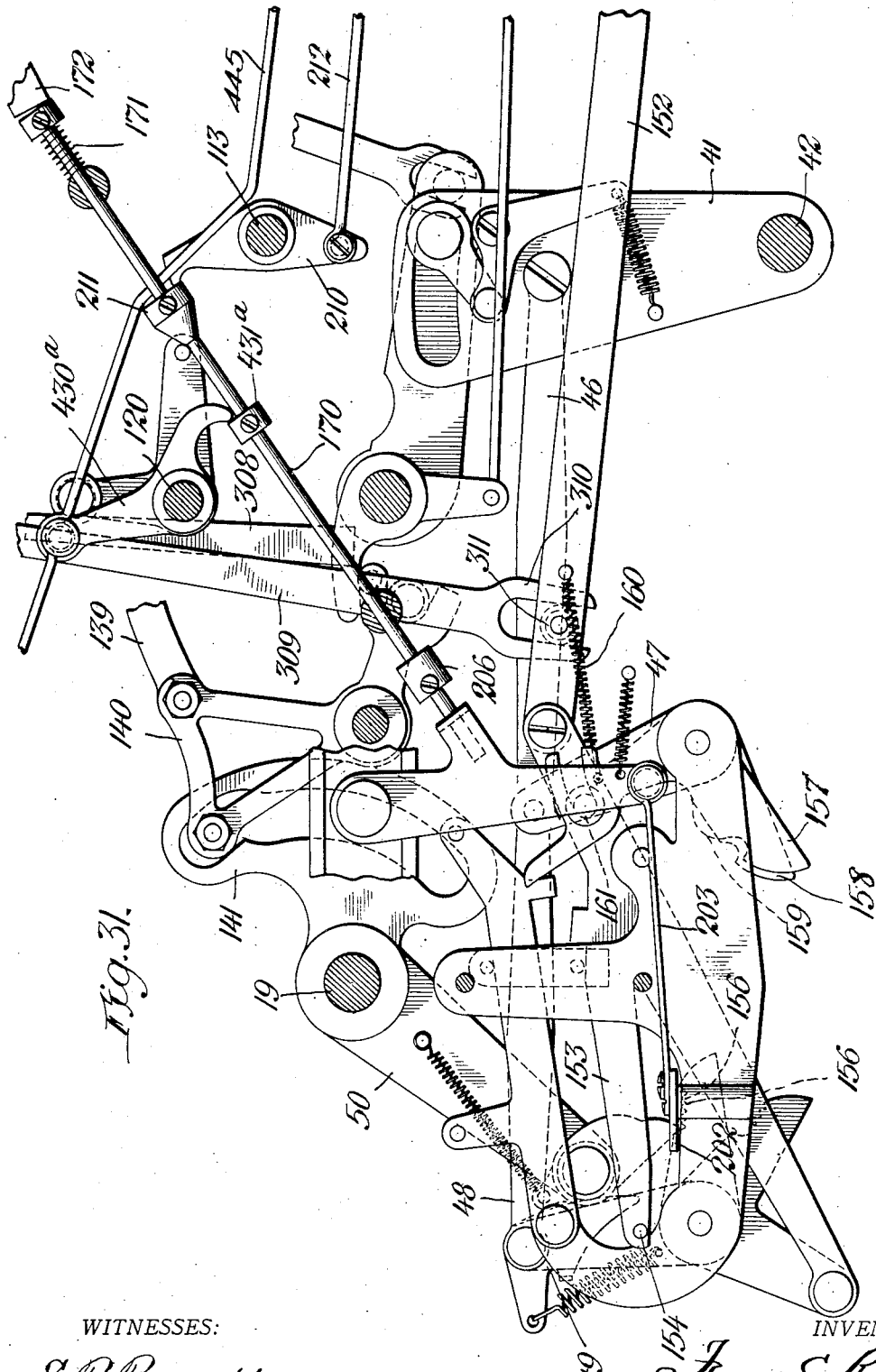

F. C. RINSCHE.
ADDING AND LISTING MACHINE.
APPLICATION FILED OCT. 7, 1909.
1,114,914.
Patented Oct. 27, 1914.
20 SHEETS—SHEET 17.
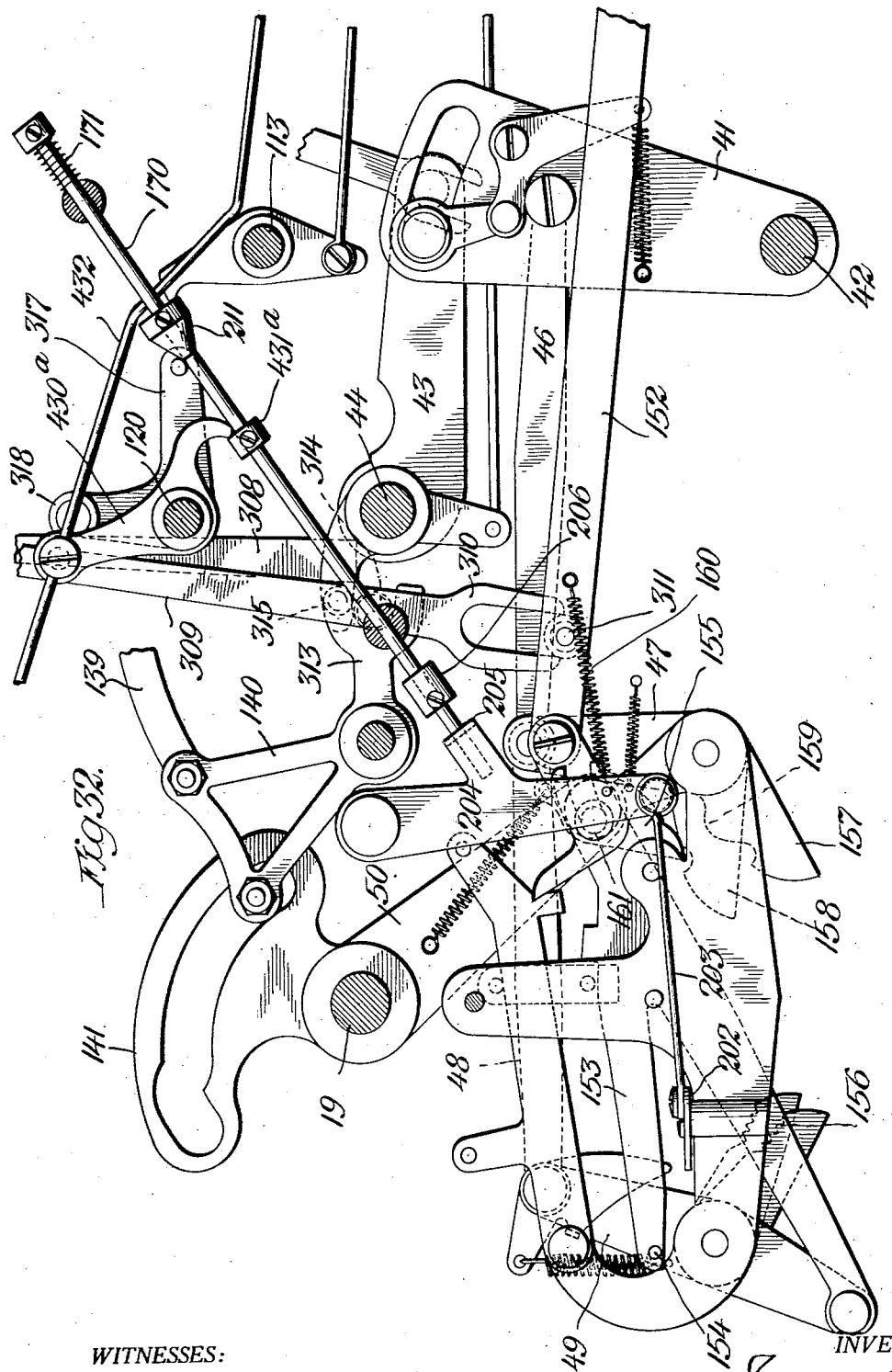
WITNESSES:
E. R. Barrett
Louis B. Erwin
INVENTOR.
Frank C. Rinsche
BY
Rector Hibben & Lewis
his ATTORNEYS.

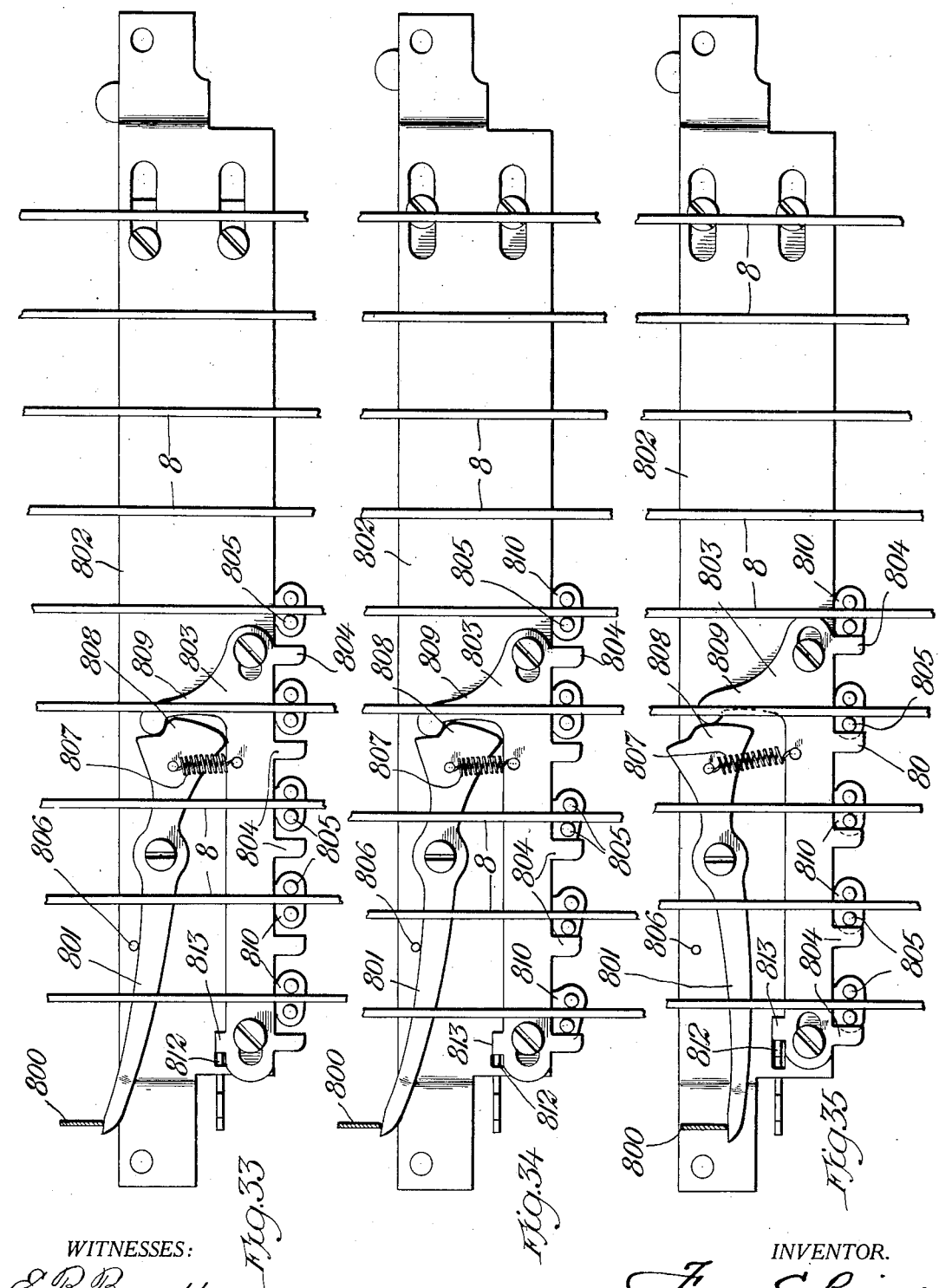

F. C. RINSCHE.
ADDING AND LISTING MACHINE.
APPLICATION FILED OCT. 7, 1909.

1,114,914.                               Patented Oct. 27, 1914.
                                            20 SHEETS—SHEET 19.

*Fig. 37.*

*Fig. 36.*

```
5,671 987 65
6,780,998.88
6,795,999.90
3,432,999.90
4,320,999.88
2,211,988.99
5,678,998.89
3,000,999.98
2,303,999.88
3,203,990.90
4,420,999.99
   10,964 84   ← Red Total
```

```
9,463,562.19    3,210,967.78
4,443,322.11    2,346,777.89
5,432,103.64    4,444,322.22
6,777,788.99    5,321,111.01
3,645,799.65    3,210,456.31
                18,533,635.21 ← Red Total
```

*Fig. 38.*

|       | DR.        | TRIAL BALANCE | CR.       |
|-------|------------|---------------|-----------|
|       |            |               | 498.74    |
|       |            |               | 96.43     |
|       | 366.50     |               |           |
|       | 18.25      |               |           |
|       |            |               | 4,268.45  |
|       | 195.18     |               |           |
|       | 32,185.10  |               |           ← Red Total
|       | 32,765.03  |               | 4853 62   ← Red Total Red Total ↗                              Separate totals ↓

*Fig. 39.*

```
  76523       456897      134853       668273
 683264      3589786      313962      4587012
 697234     35203124     4687537     40587895
5435679     24310013     5796429     35542121
                                     81385301
```
Grand total Witnesses:
E. R. Barrett
Louis B. Erwin Inventor
Frank C. Rinsche
by Rector & Hibben Davis
his Attys

F. C. RINSCHE.
ADDING AND LISTING MACHINE.
APPLICATION FILED OCT. 7, 1909.

1,114,914.

Patented Oct. 27, 1914.

Witnesses
E. R. Barrett
Louis B. Erwin

Inventor
Frank C. Rinsche
by Rector Hibben Davis
his Attys.

UNITED STATES PATENT OFFICE.

FRANK C. RINSCHE, OF ST. LOUIS, MISSOURI, ASSIGNOR, BY MESNE ASSIGNMENTS, TO BURROUGHS ADDING MACHINE COMPANY, OF DETROIT, MICHIGAN, A CORPORATION OF MICHIGAN.

ADDING AND LISTING MACHINE.

1,114,914.  Specification of Letters Patent.  Patented Oct. 27, 1914.

Application filed October 7, 1909. Serial No. 521,589.

*To all whom it may concern:*

Be it known that I, FRANK C. RINSCHE, a citizen of the United States, residing in St. Louis city, in the State of Missouri, have invented certain new and useful Improvements in Adding and Listing Machines, of which the following is a specification.

The invention relates especially to that type of adding and listing machine in which more than one counter or set of accumulating wheels is employed, such type of machine wherein two counters or sets of accumulating wheels are employed being generally termed a "duplex" machine.

One object of the present invention is to provide for insuring against incorrect accounting due to any mechanical defect or failure of mechanical parts to properly perform. No matter how carefully mechanical parts may be constructed and assembled, nor how thoroughly the same may be tested out, it is always possible that misoperation may occur and it is a somewhat common practice, particularly in banking institutions to employ two adding machines to go over the same work so that one may check over the work of the other.

By the present invention provision is made for simultaneously accumulating on two counters or sets of wheels, the transfer or carrying mechanism associated with one set of wheels being radically different in principle of operation from such mechanism associated with the other set of wheels, which arrangement is believed to reduce to the minimum the possibility of error through erratic mechanical action, since it is an exceedingly remote possibility that two mechanisms constructed and operating upon different principles would correspondingly develop defects. In this connection it is furthermore provided that each set of wheels shall yield a total independently of the other and the printing of the total as set up in type under the control of the two sets of wheels independently of each other will serve to verify the correctness of the total as it appears upon the printed record.

Another object of the invention is to so arrange two sets of accumulating wheels together with actuators common to them and controlling devices that either of two methods can be employed for summing up various subtotals while preserving a grand total, the separate subtotals being printed as footings of different series of items and then the grand total printed, one such method being to simultaneously register the successive items in both sets of accumulating wheels and then restore one set only to zero for printing the subtotal, thereafter resuming the simultaneous registering of items in two sets of accumulators; and the other method consisting in the registering of successive items in only one set of wheels and then in turning such wheels to zero, transferring the total they carry to the other set of wheels to be there preserved while the first set of wheels is again utilized for registering successive items. When using the machine according to either of these methods a designating number may be employed if desired to differently identify different groups of items, as for example when sales made by different clerks are being recorded and registered and separate totals struck for the different groups of items while all are accumulated into a grand total.

A further object of the invention is to provide for primarily registering items successively in one set of wheels and at the will of the operator registering certain selected items additionally in the other set of wheels, as for example where in registering amounts of a miscellaneous assortment of bank checks it is desired to ascertain the total of checks of a certain depositor.

The invention further provides for an automatic alternation in registration of amounts on the two sets of wheels, generally accompanied by printing of the amounts first in one column and then in another. In this connection provision is also made for printing in one column without any accumulation as when it is desired to record a series of accumulated amounts with designating numbers or dates opposite the same respectively.

With the above and incidental objects in view, the invention consists in certain novel features of construction and combinations of parts the essential elements whereof are recited in the appended claims and a preferred form of embodiment of which is described in detail hereinafter and illustrated in the accompanying drawings forming part of this specification.

Figure 2:
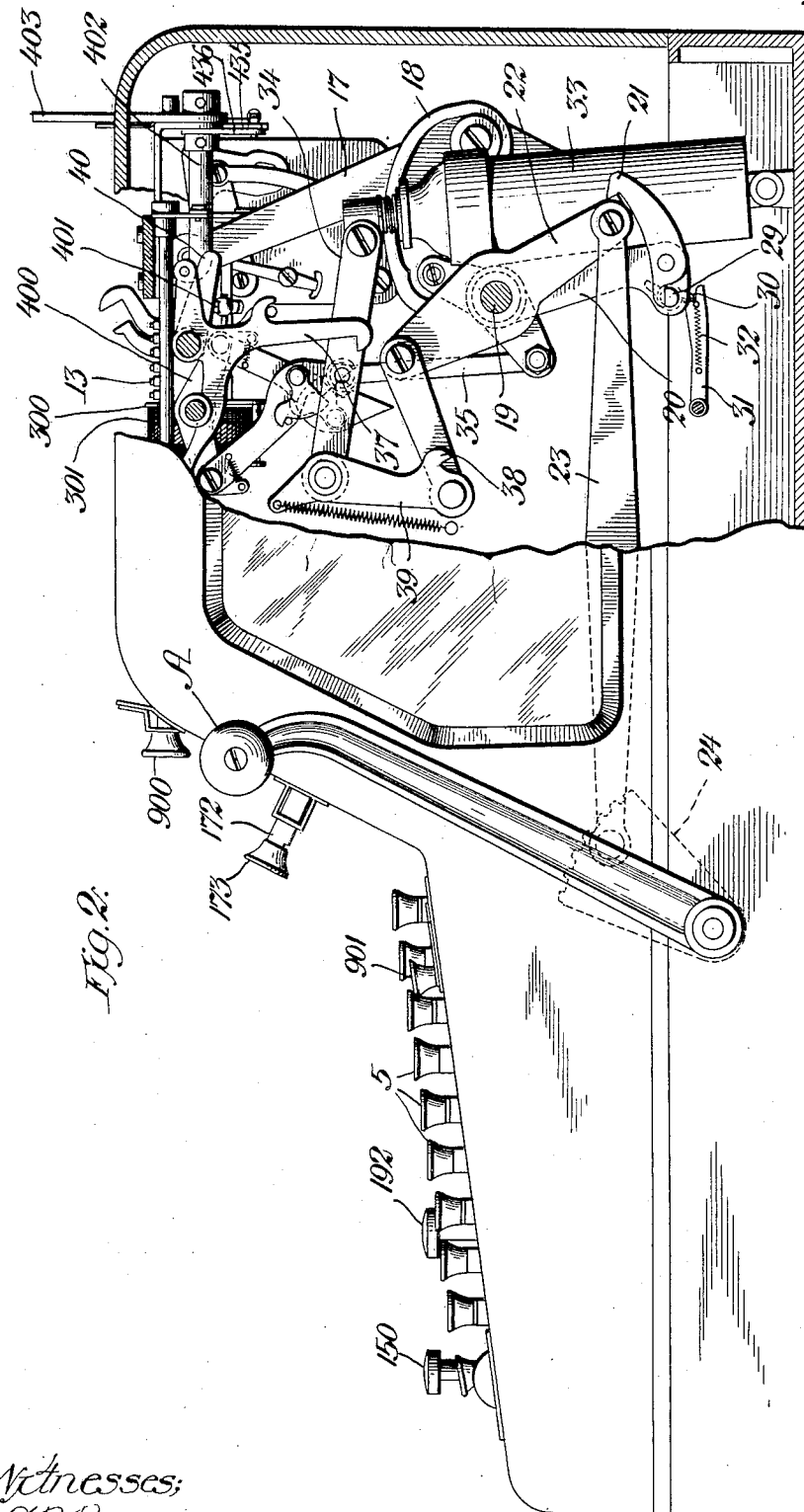
Figure 3:
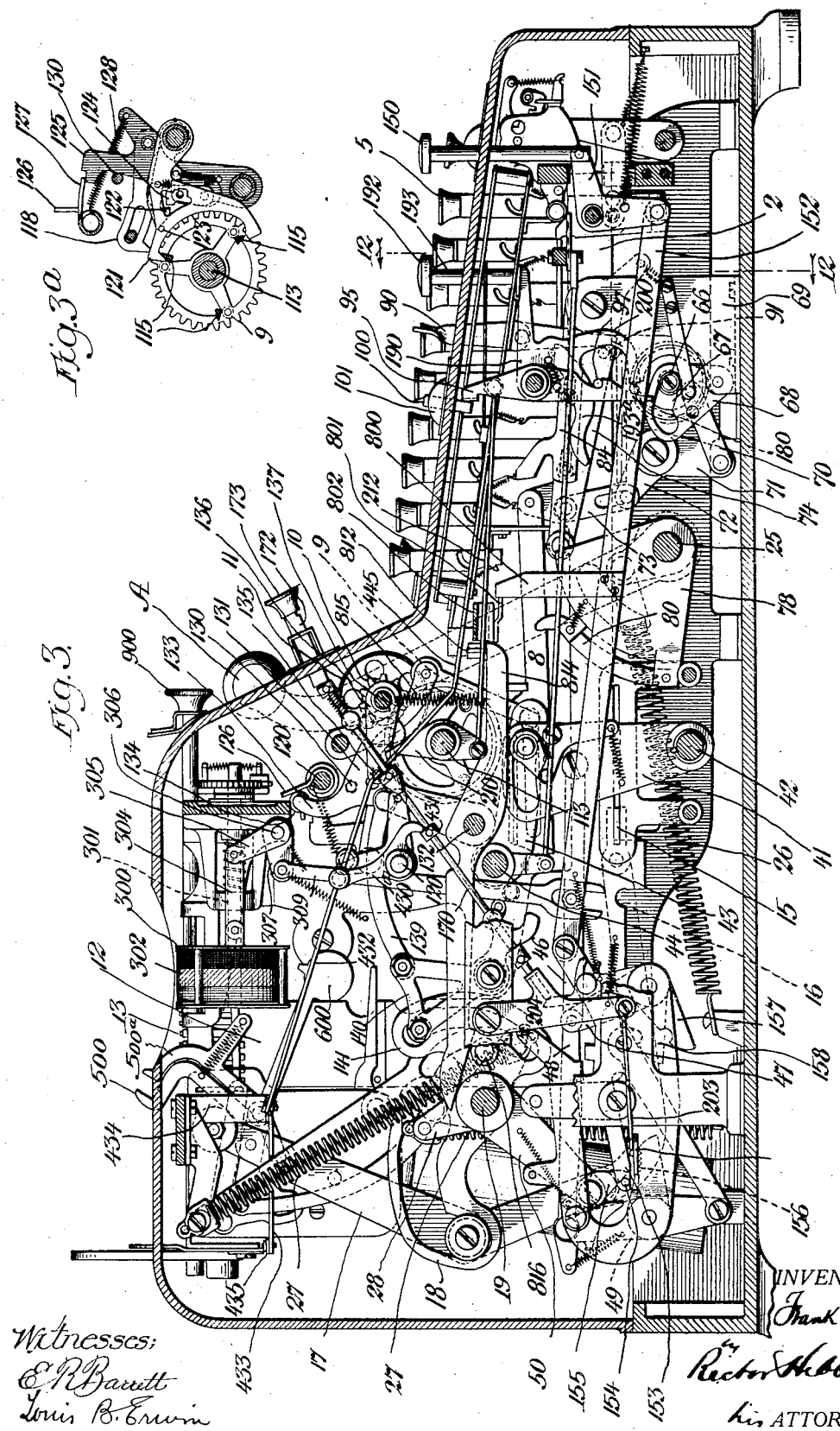
Figure 4:
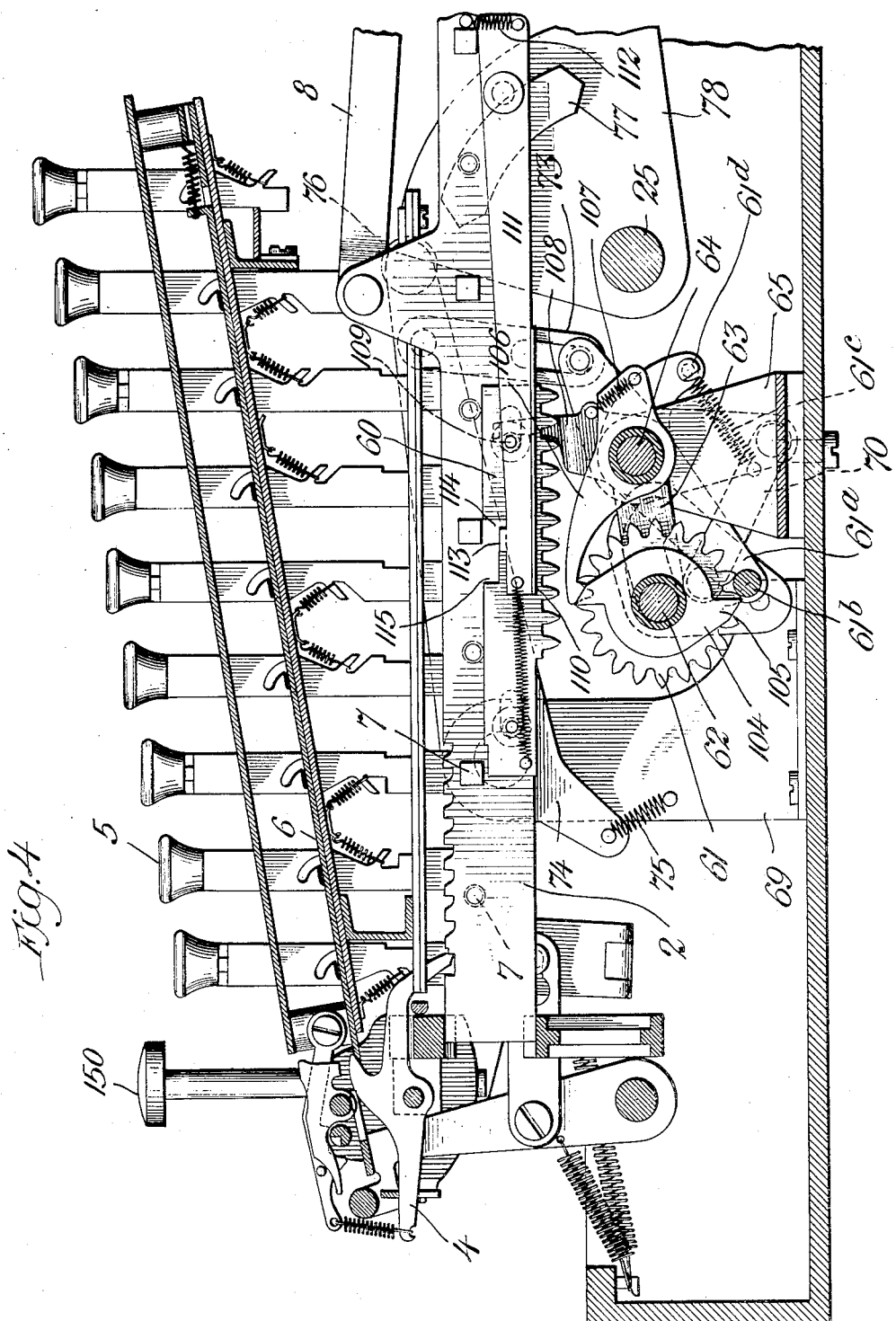
Figure 5:
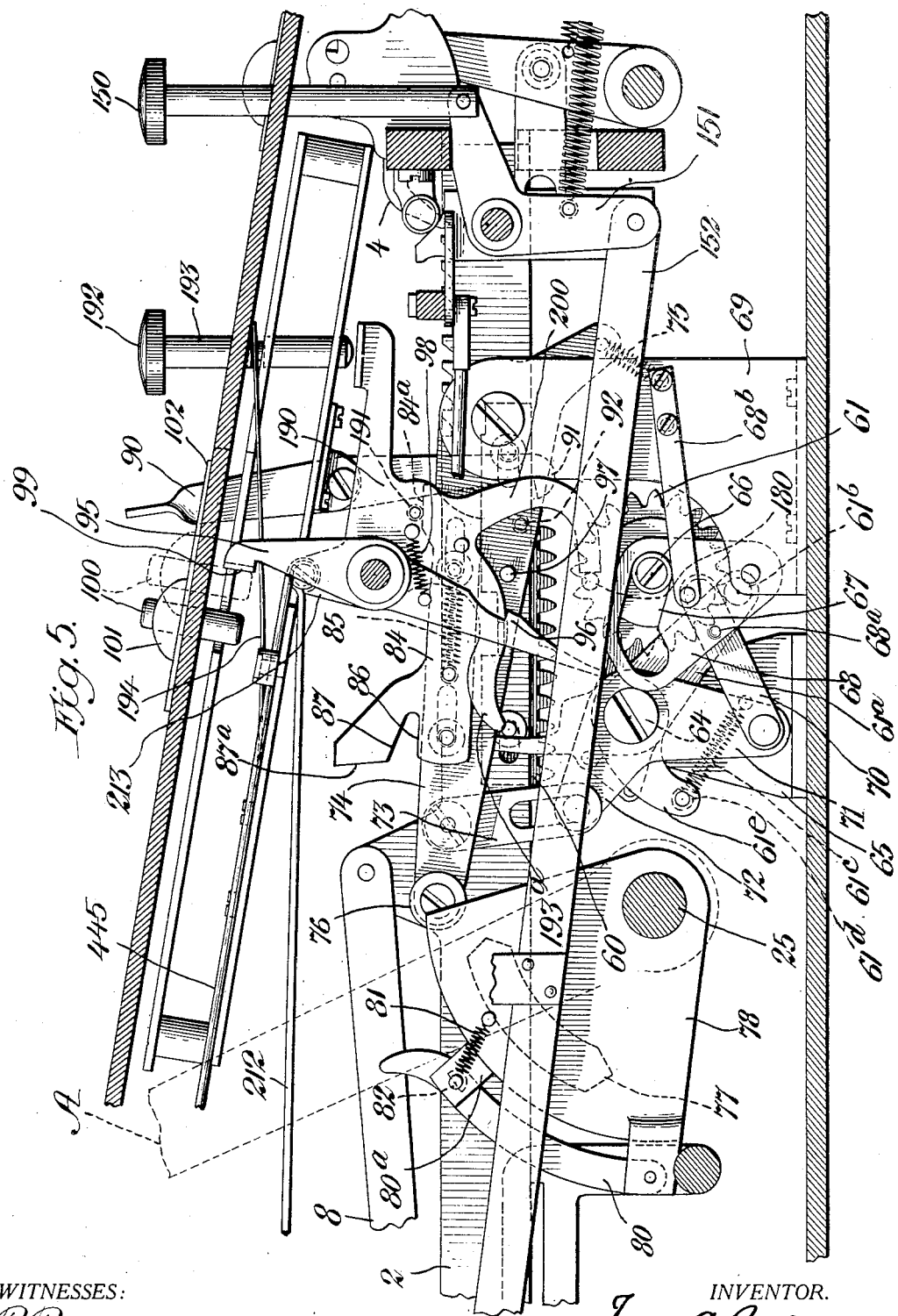

Of said drawings, Figure 1 represents the top plan view of the complete machine; Fig. 2 represents the machine in right side elevation with a portion of the casing broken away to disclose interior mechanism and also with the laterally shifting paper carriage removed; Fig. 3 is a left side elevation of the complete machine with the exception of the shifting paper carriage, the inclosing casing appearing in section, as well as various cross shafts, studs and frame pieces; Fig. 3ª is a sectional left side elevation of transfer mechanism of the regular accumulator; Fig. 4 is a vertical section taken from front to rear and on an enlarged scale as compared with Figs. 1 to 3 and including only the keyboard and mechanism below the same; Fig. 5 is a somewhat similar view looking from the opposite or left-hand side of the machine and showing an adjustment of controlling devices which provides for accumulating in the extra set of wheels as distinguished from what may be termed the normal adjustment illustrated in Fig. 3, which provides for accumulating in the regular set of wheels only; Figs. 6, 6ª and 6ᵇ are views similar to Fig. 5 and illustrate the effects of drawing forward the operating handle under the adjustment shown in Fig. 5; Fig. 7 is another view similar to Figs. 5 to 6ᵇ though not showing so many parts, and here the condition is that which obtains when the handle is traveling back to normal; Fig. 7ª is a like view, showing the condition at the conclusion of an operation for registering an amount on the supplemental accumulator; Fig. 8 is a view similar to the lower portion of Fig. 4 but illustrating a different relative positioning of parts as when a carry has just occurred between wheels of the extra set; Fig. 9 is a detail elevation of certain parts appearing in Fig. 7 in side elevation; Fig. 10 is a view similar to Fig. 5 with a less number of parts and with those parts adjusted as for taking a total from the extra set of wheels; Fig. 11 is a similar view illustrating the effect of drawing forward the operating handle under the above mentioned adjustment; Fig. 12 is a vertical cross-section taken substantially on the line 12—12 of Fig. 3; Fig. 13 is a horizontal section taken substantially on the line 13—13 of Fig. 12; Fig. 14 is a rear elevation of the machine with the inclosing casing broken away and a certain carriage reciprocating bar also broken away as well as a portion of the carriage; Figs. 15 and 16 are detail sectional views of means for throwing on and off the paper line feed, Fig. 15, illustrating the "on" adjustment and Fig. 16 the "off"; Fig. 17 is a top plan view of the rear portion of the machine on an enlarged scale with part of the paper carriage broken away to disclose mechanism beneath and one end portion broken away altogether; Fig. 18 is a similar view of such end portion of the paper carriage to which Fig. 17 does not extend; Fig. 19 is a sectional detail view taken substantially on the line 19—19 of Fig. 14; Figs. 20 to 24 show details of the mechanism illustrated in Fig. 19; Fig. 25 is a sectional view taken on the line 25—25 of Fig. 17; Fig. 26 is a similar sectional view illustrating a different adjustment; Fig. 27 is a section taken on the line 27—27 of Fig. 17; Fig. 28 is a left-side elevation of a portion of the machine including the paper carriage and certain line-spacing devices thereon; Fig. 29 is a side elevation of part of the mechanism at the rear of the machine looking from the right and including certain devices for timing the engagement and disengagement of the regular accumulating wheels and their racks; Fig 30 is a sectional view taken substantially on the line 30—30 of Fig. 29; Fig. 31 represents in left-side elevation the mechanism appearing in right-side elevation in Fig. 29 but with certain of the parts differently positioned as a result of depressing either one of the total keys; Fig. 32 is a view similar to Fig. 31 illustrating the effect of drawing forward the operating handle under conditions such as illustrated in Fig. 31; Figs. 33 to 35 are bottom plan views of parts concerned in restoration of racks to coöperative relation with wheels of the regular accumulator when taking an "extended" total; and Figs. 36 to 42 show various examples of work of which the machine is capable.

The invention is here shown as embodied in a well known type of adding machine, to-wit that heretofore patented by me and known upon the market as the "Universal" and for a general understanding of the particular type of adding and listing machine here referred to I shall have occasion throughout this specification to refer from time to time to various prior patents from which an understanding may be had of various departments of the machine, the particulars of which are not directly concerned with the carrying out of the present invention and hence need not be specifically set forth herein. While as stated the present invention is shown embodied in this particular type of machine, it is nevertheless to be understood that this invention may be otherwise embodied, as for example by application to other well-known types of adding and listing machines.

In the form of embodiment of the invention here detailed the general arrangement as to a primary accumulator, actuators therefor, setting-up devices and printing mechanism follows that of early patents of mine, No. 654,181 issued July 24, 1900, No. 726,803, issued April 28, 1903, No. 751,207 issued February 2, 1904. Thus horizontally arranged slide bars 2 tend to move forward under impulse of spiral springs but are normally restrained by pivoted spring-held pawls 4, Fig. 4, engaging notches in the upper edges of the bars, said pawls adapted to be displaced individually by depression of amount keys 5 through coöperation between cam slots of the key stems and pins on sliding detent strips 6 which at their forward ends act upon prongs of said pawls. The key stems intercept stop lugs 7 on the slide bars to variously measure excursions of the latter. These slide bars as usual have racks 8 pivoted to them (Fig. 3) and movable into and out of engagement with gear wheels 9, the latter meshing with pinions 10 on numbered wheels 11 which show through suitable openings in an upright portion of the casing. There are fastened to the rear ends of the slide bars upstanding plates 12 each carrying a series of slidably mounted types 13 facing upward under a laterally shiftable paper carriage 14, Fig. 1. A bar 15, Fig. 3, extends across in front of shoulders of the slide strips and this cross bar reciprocates whenever the handle 16 of the machine is pulled forward and released, the advance of the cross bar which accompanies the forward pull of said handle permitting advance of such slide bars as have been released from restraint of the pawls 4 by depression of amount keys, and the retraction of the cross-bar which accompanies return of the handle to normal operating to restore such slide bars. The said cross-bar is pivotally connected to a pair of links 16, the latter at their rear ends being pivotally connected to arms 17 depending from and pivotally connected to brackets on the upper portion of the supporting framework and said arms carry rollers occupying cam slots in segments 18 secured to a rock shaft 19 as shown in Figs. 2 and 3, said rock shaft also having secured to it a depending arm 20, Fig. 2, carrying a spring-held catch 21 engaged behind a lever 22 loosely mounted upon the rock shaft 19 and having its downwardly extending arm connected by a link 23 to the full stroke sector 24 secured to the handle shaft 25. Stout springs 26 connect crank arms on said shaft 25 with the base casting of the machine, said springs holding the handle rearward and operating to return the same after it has been drawn all the way forward. The forward pull of the handle swings the lower arm of the lever 22 forward and the arm 20 follows under actuation of stout springs 27, Fig. 3, which connect oppositely extending crank arms 28 secured to a rock shaft 19 with the base casting and an overhead bracket respectively. Of course it will be understood that the springs 26 are collectively superior to the springs 27 and the latter simply exert power to drive the mechanism as permitted by a pull of the handle against the stress of the springs 26. However, provision is made for permitting the springs 27 to perform their full function without requiring the handle to be more than just started, the object in this connection being to insure an operation of the machine if the handle is pulled forward at all. It will be obvious that this can be effected by merely disengaging the catch 21 from the arm 22. A forward extension of the catch has a straight under edge normally engaging a flattened side of a rotary stud 29 in the arm 20, said stud having a finger 30, Fig. 2, normally engaged with a dog 31 pivoted on the side of the machine base and connected by a spring 32 with a stud projecting from the said base side. A slight forward swing of the arm 20 resulting from starting the handle forward will turn the stud by reason of engagement of the latter's finger 30 with said dog and this has the effect of rocking the catch 21 and disengaging it from the lever 22, whereupon the springs 27 continue to rock the shaft 19 independently of the arm 22, the finger 30 wiping over the dog 32. These springs are under control of a dash-pot 33, the piston of the latter being connected to an arm 34 and the latter connected by a link 35 with a crank arm 36 on the rock shaft 19. In order to time the return movement of the parts a spring-held pivoted depending hook 37, Fig. 2, is adapted, upon completion of the forward stroke of the operating handle, to engage a hook 38 on one member of a toggle 39 which connects the upper arm of the lever 22 with the frame of the machine. The hook 37 is displaced by the action of a stud 40 against a finger 40 secured to the hub of said hook, said stud 40 connecting the arm 34 with the piston rod of the dash-pot. In this manner the start rearward of the operating handle is under control of the dash-pot which insures proper timing. Of course with a moderate forward pull of the operating handle there will be no interlocking of the hooks 37 and 38 because in such case the direct handle-connected parts are not moving in advance of the dash-pot-controlled parts. The above described driving devices are disclosed in my Patent No. 1,001,688 issued Aug. 29, 1911.

The pivoted racks heretofore mentioned are moved into and out of engagement with the gear wheels 9 by a familiar form of means comprising cam sectors 41 (Figs. 3 and 29) secured to a rock shaft 42 and acting upon roller studs of a bail comprising side arms 43 secured to a rock shaft 44 and a cross rod 45 engaging slots in the racks. A link 46 connects the left hand sector 41 with a radius bar 47 on a frame stud and a second link 48 connects said radius bar with a second radius bar 49 on another frame stud. An arm 50 secured to the rock shaft 19 carries a roller stud 50' (Fig. 29) between said radius bars and adapted to operate upon them to reciprocate the links 46 and 48. Normally, i. e. under an adding adjustment, the racks 8 are disengaged from the wheels 9 and remain so during the forward pull of the operating handle at the conclusion of which the racks are moved into engagement with the wheels (through action of the stud 50' upon radius bar 47) and so remain during the backward stroke of the operating handle, being disengaged at the very close thereof by action of the said stud upon radius bar 49.

It is proposed by the present invention to have the slide bars 2 operate a second set of accumulating wheels and to this end there are mounted upon these bars near their forward ends racks 60, Fig. 4, with slot and pin connections to permit one step movement of the racks independently of the bars for carrying purposes as hereinafter explained. The rack teeth face downward and are adapted to engage respectively with accumulator pinions 61 sleeves upon the cross rod 62 of a bail comprising also side arms 63 secured to a rock shaft 64 which is journaled in brackets 65 rising from the base of the machine as shown in Fig. 4. On the left-hand end of the bail cross-rod 62 there is a roller 66, Figs. 3 and 5, which engages a cam slot 67 in a rocking plate 68 pivoted to a bracket 69 on the base of the machine. Through the rocking of this plate the bail is swung up and down and the pinions engaged with and disengaged from the racks. A link 70 connects said cam plate with the depending arm of a bell crank lever 71 loosely mounted upon the rock shaft 64 and having its rearwardly extending arm 72 engaged with the slot of a link 73 depending from an arm 74 pivoted at its forward end upon the bracket 69 and swung upward by a spring 75 connecting its forward extension with the bracket 69, all as shown in Fig. 5. A roller 76 on the rear end of the arm 74 is adapted to coöperate with a double-acting cam strip 77 on the inner side of a sector shaped plate 78 secured to the handle shaft 25. There is pivoted to an ear on one end of the plate 78 a curved finger 80 having an upturned forward end connected by a spring 81 with the said plate and having a stud 82 adapted to act upon the arm 74 to carry the roller 76 over the point of the rear end of the cam strip 77 when the handle has been drawn all the way forward, as illustrated in Fig. 6^b, the spring movement of said finger being limited by encounter of a block 80^a upon it with the edge of the sector 78. This movement of the accumulator but simply carries the link 73 downward the length of its slot. Then upon return of the handle the cam strip 77 acting upon the roller 76 forces the arm 74 farther downward, thus rocking the bell crank lever 72—71 and through the medium of the link 70 swinging the cam sector 68 forward and forcing the pinions 61 into engagement with their racks so that as the slide strips 2 move rearward said pinions will be turned to register the amount set up by depression of amount keys. The spring 81 is necessarily superior in action to the spring 75, so that in the forward rocking of the sector 78, when the concentric outer end of its cam strip has passed by the roller 76, said spring 81, which meantime has been stretched by reason of engagement between the stud 82 and the upper edge of the arm 74, (Fig. 6) will force the latter downward as permitted by the passing of the upper rear inclined edge of the cam strip.

The cam strip 77 having operated in the manner described to move the pinions 61 into mesh with their racks at the outset of the return stroke of the operating handle, this engagement continues while the under concentric edge of the cam strip travels over the roller 76 as illustrated in Fig. 7 and in fact it continues thereafter, for the spring 75 is not strong enough to more than lift the arm 74 until the lower end of the slot of the link 73 comes up against the stud of the bell crank arm 72 without moving the latter. This movement is sufficient, however, to carry the roller more than halfway up past the forward point of the cam strip (Fig. 7^a) so that at the outset of a subsequent operation the cam strip operating upon the roller will lift the latter and the arm 74 rocking the bell crank 72—71 and swinging the cam sector 68 rearward disengaging the wheels from the racks preparatory to another registration. In order to insure against accidental shifting of the sector 68 depressions 68^a are formed in its outer side to be engaged by a pointed stud carried by a flat spring 68^b secured to the bracket 69, as shown in Fig. 5. A further safeguard is to be found in means for locking the wheels 61 against possible turning when disengaged from their racks. Thus a pair of arms 61^a (Figs. 4 and 5) journaled upon the rock shaft 64 carry between them a cross-rod 61^b and the arms have rearward extensions connected by spiral springs 61^c with the brackets 65, said springs acting to hold the cross-rod in the teeth of the pinion 61 to prevent rotation of the latter. As the accumulator swings upward toward the racks the locking bail above described follows until the teeth of the wheels start to mesh with the teeth of the racks. Then the bail is restrained by reason of contact of studs 61^d on the rear portions of its arms 61^a with edges of the brackets 65 and further movement of the accumulator disengages it from the bail cross-rod.

Now it will be seen that the above described arrangement will provide for registering amounts simultaneously in the regular accumulator and the forward or supplemental accumulator and it is intended that this may be done whenever desired. At the same time objects of the invention heretofore stated require that the forward or supplemental accumulator be at times prevented from coming into play in the manner described. It will be obvious that if the arm 74 is not permitted to lower, the supplemental accumulator will not be brought into engagement with its racks. Two separate devices are provided for holding up said arm, one such device being subject merely to simple manipulation whereas the other, though shifted by similar manipulation, is adapted to be otherwise operated as will be described hereinafter. The first mentioned device is in the form of a lever 90 which protrudes through the keyboard at the left-hand side (Fig. 1) and is formed into a handle by which to move the lever back and forth in a slot of the keyboard. This lever is pivoted intermediate its ends to a bracket on one of the keyboard plates (Figs. 3, 5 and 6) and at its lower extremity takes the form of a hook 91 adapted to engage under the stud 92 on the arm 74 so that when the lever is thrown forward at its upper end this hook engaged under said stud will prevent any lowering of the arm 74 and hence prohibit engagement of the pinions 61 with their racks. This device which may be termed an eliminating key can be utilized for example when it is desired to use the machine as an ordinary single counter adding machine, but it comes into play in other connections also as will be hereinafter explained. Of course when the supplemental accumulator is to register items it is necessary that said lever 90 be thrown rearward at its upper end. It is also necessary that a second lever 95 shall be thrown forward as to its upper end, this second lever constituting the other device above mentioned for restraining the arm 74. It is enabled to do so by reason of the fact that its lower arm has a hook 96 for engaging under a stud 97 on said arm as illustrated in Fig. 3. This lever is drawn forward as to its lower end by a spiral spring 98 and at its upper end has a laterally turned lip 99 standing in front of the stem 100 of a button 101 sliding on the keyboard, (Fig. 1). The stem 100 protrudes upwardly through the button or key and is spring-held upward (Fig. 6ᵇ) to engage it with enlargements of a slot in a small plate 102 secured to the keyboard, (Fig. 1), this arrangement being merely for the purpose of insuring two positions of the key and blocking the spring 98 when the button or key is forward. In the rearward position of this key it does not restrain the spring 98 from engaging the hooked lower end of the lever 95 with said stud 97 as illustrated in Fig. 3, but by sliding the key forward its stem 100 will be caused to act upon the lip 99 of said lever rocking the latter as shown in Fig. 6 so as to disengage its hook from the stud 97 and permit the operation heretofore described to take place. So long as said key 101 remains forward and the handle of the lever 90 rearward accumulation in the supplemental counter will continue to take place.

In Figs. 3 and 5 the arm 74 is shown in its uppermost position, notwithstanding the segment 78 is rearward, and in an operation of registering on the wheels 61 they would be left in engagement with the racks, and said arm 74 would be left only partially elevated, as previously explained and as shown in Fig. 7ᵃ. But it will be noted that in Fig. 3 the locking levers 90 and 95 are both engaged with the arm 74 to uphold the same, and it is to be assumed that such was the condition prior to throwing said levers to the unlocking positions illustrated in Fig. 3. It will be understood that if the stop lever 95 is free from restraint when an operation is performed under conditions illustrated in Fig. 7ᵃ, the arm 74 upon being raised by cam-strip 77 will be caught by said lever and so will not lower when the cam-strip passes forwardly beyond the roller 76.

It will have been seen that the supplemental accumulator is arranged somewhat differently than the regular or primary accumulator in that it rocks into and out of engagement with actuating racks instead of the racks moving into and out of engagement with the pinions. The important difference, however, is that the carrying mechanism of the supplemental accumulator is of a different character from that of the primary accumulator, the purpose being to have one form of carrying mechanism operating upon one principle serve as a check upon the operations of another sort of carrying mechanism when the two accumulators are both registering items and the same total should be registered upon each and printed.

Referring now to the carrying mechanism of the supplemental accumulator, the sleeve of each pinion carries a disk 104 (Figs. 4, 8, 12 and 13) which disk is formed with diametrically opposite tripping projections 105, the capacity of each wheel in the present instance being 20, so that there should be a carry with each half rotation. Mounted loosely upon the rock shaft 64 are a series of pawls 106 with forward ends inclined and shouldered for coöperation with the projections 105, both for transfer tripping purposes and for zero stopping purposes. Springs 107 connect the rear arms of these pawls with studs on a series of upstanding arms 108 secured to the rock shaft 64 and extending behind studs 108 on the racks 60 respectively, normally holding the latter forward against the stress of their springs, the normal condition being here assumed to be that in which the pinions 61 are disengaged from the racks, which means that the bail carrying the pinions is lowered and the rock shaft 64 turned in a direction to advance the arms 108 as illustrated in Fig. 4. The pawls 106 when raised by action of the inclined sides of the projections 105 against the inclined edges of the pawls, are adapted to come up against flanges 110 upon arms 111 pivoted to the sides of the slide bars 2, see Fig. 8. These arms are connected by springs 112 with the slide bars, said springs tending to lower the forward portions of the arms holding laterally turned lugs 113 of the arms engaged behind shoulders of notches formed in the upper edges of racks 60 as shown in Fig. 4. Each of the latter is formed with a deep notch 114 and forward of that with a shallower notch 115. When the accumulator is lifted into engagement with the racks of course the arms 108 move rearward and the several racks are then restrained from rearward movement by engagement of the intermediate notch shoulders with the lugs 113. However, when a pawl 106 is lifted and caused to act against the flange 110 of the associated arm 111 lifting the latter, the lug 113 will be disengaged from such notch shoulder whereupon the rack will be thrown rearward by its spring and will turn its pinion 61 one step. It will of course be understood that the tripping disk 104 carried by one pinion engages the pawl 106 which lifts the arm 111 associated with the rack of the next higher pinion, and if the next higher pinion in being thus turned a step forward be carried past the zero point, then it will in turn cause a tripping of the still higher rack and a corresponding one-step turning of the pinion associated therewith and so on through the series. When the accumulator is swung downward in the manner hereinbefore explained, the arms 108 will be thrown forward and will restore the racks 60 to normal when the lugs 113 reëngage them under impulse of the springs 112.

The primary accumulator transfer mechanism is illustrated in Figs. 3 and 3ª. It is that shown and described in my prior Patent No. 995,509 issued June 20, 1911, and comprises beveled projections 115 on the wheels 9, trip levers 121 spring-held in the paths of said projections, detents 122 pivoted upon the same cross-rod as said pawls and spring-held with their inclined rear edges against pins 123 on the trip levers, dogs 124 restrained by said detents and pivoted upon arms 125 with provision for limited play, being spring-held rearward, pawls 118 pivoted on said arms 125 and adapted to engage the teeth of the wheels 9, springs 128 drawing the arms 125 forward, a comb plate 127 pivoted upon a cross-rod 120 and having an upstanding finger 126 at the left-hand end, Fig. 3, a resetting bail for the arms 125, said bail comprising a cross rod 130 and side arms 131 secured to a rock shaft 132, the left side piece having an upward extension 133 carrying a roller 134 to act against said finger 126, a bail comprising a cross rod 135 engaging cam slots in the side pieces 131 of the previously mentioned bail and also extending through slots in the pawl 118S, and side arms 136 secured to a rock shaft 137 on which the pinions 10 and wheels 11 are loosely journaled, a link 139 connecting the left bail side arm 131 with a rock plate 140, and a cam slotted sector 141 secured to the rock shaft 19.

In operation the bail, composed of side arms 131 and cross rod 130, is oscillated and the pawls 118 raised and lowered through the connections described to engage said pawls with and disengage them from the wheels 9 and in the event of a wheel passing the zero point the trip lever 121 is raised thereby lifting the detent 122 and releasing the dog 124 to permit the arm 125 to advance when at the close of the operation the roller 134 strikes the finger 126, lifting the plate out of engagement with the arms 125.

It will now be seen that the two transfer mechanisms differ essentially in their principles of operation, carrying movements being imparted to wheels of the primary accumulator independently of any movement of the racks and after the wheels have been disengaged from the racks, whereas carrying movements of the wheels of the supplemental accumulator are effected by the racks while the latter are engaged with the wheels. There is also a difference in timing in that transfer movements of the wheels of the supplemental accumulator occur immediately upon the tripping of the transfer devices, whereas transfer movements of the wheels of the primary accumulator are necessarily delayed until the machine is at the close of an operation.

Passing now to the totaling mechanism 150 designates the regular total key located at the lower left-hand corner of the keyboard, (Figs. 1 and 3), and having its stem pivoted to a bell crank lever 151 whose depending arm is pivoted to a long link 152 extending to the rear portion of the machine and there pivoted to a thrust bar 153 of irregular shape having a pin 154 at its rear end lying behind a spring drawn dog 155 upon the lower end of the before mentioned arm 50, all as shown in Fig. 3, see also Figs. 29 to 32, and as disclosed in my said prior Patent No. 995,569. Said dog is adapted to engage teeth in the upper edge of an arm 156 projecting forward from the hub of the rear radius bar 49 but normally the pin 154 holds the dog disengaged from said arm (see Figs. 3 and 29). Upon depression of the total key the resultant rearward movement of the thrust bar 153 releases the dog (Fig. 31) permitting it to engage the teeth of said arm so that upon drawing forward the operating handle (Fig. 32) the arm will be forced down and the racks 8 engaged with the accumulator wheels through the connections heretofore described, at the outset of the operation. In order to disengage the racks from the wheels at the beginning of the backward stroke of the operating handle in taking a grand total the forward radius bar 47 has secured to its hub a notched rearwardly extending arm 157 which the dog 155 operates upon, having first straightened under impulse of its spring after leaving engagement with the toothed arm 156 and then having wiped over the curved edge of the notched arm 157 passing the notch therein as illustrated in Fig. 32. This disengagement of the racks from the wheels only occurs if the total key is held down throughout the operation. A guard plate 158 is pivoted upon the same stud as the radius bar 47 and notched similarly to the arm 157 but formed in rear of the notch with a hump 159. An upwardly extending arm of said plate is held forward by a spring 160 so that normally the hump prevents engagement of the dog with the notch of the arm 157. A pin 161 on the thrust bar 153 engages a bifurcation in the upright arm of the guard plate 158 so that upon depression of the total key the guard plate is rocked rearward and if the key is held down as the handle returns the hump 159 does not restrain the dog. However, if the key is released at the end of the forward stroke of the operating handle then the guard plate returns to normal and the hump becomes effective to prevent engagement of the dog with the notch of the arm 157, so that with the return of the operating handle the racks remain in mesh with the wheels. Thus a sub-total can be taken according to the usual mode of procedure.

For purposes of elimination i. e. printing numbers not to be registered, a rod 170 is arranged to slide obliquely through the framework and operate at its lower rear end upon an upward projection of the guard plate 158, so that though at the end of the forward stroke of the handle the racks will be moved into mesh with the wheels, they will be immediately disengaged therefrom as the handle starts back owing to the fact that the dog 155 takes effect upon the notched arm 157, the guard plate having been rocked rearward by the said rod 170 so as to render its hump 159 ineffective. Said rod is held forward by a spiral spring 171 and is acted upon by the stem 172 of a key 173 (Fig. 3) protruding from the oblique portion of the casing and guided loosely in a keeper so that a notch in the stem can be engaged with the latter to temporarily hold the key in.

In order to provide for transferring an accumulation from the primary set of wheels to the supplemental set of wheels after a series of amounts have been accumulated on said primary wheels while the supplemental wheels were idle, the key 101 having remained in its rearward position with the hook 96 engaged with the stud 97 as shown in Fig. 1, a stud 180 (Figs. 5 to 7) is provided upon the link 152 extending in front of a downward extension of said hook so that upon depression of the total key 150 said hook will be displaced and as the handle starts rearward the supplemental accumulator wheels will be moved into mesh with their racks in the manner before described and therefore in the return of the racks to normal the accumulation which was upon the primary wheels will be registered upon the supplemental wheels. This will take place whether the total key is held down throughout the operation or not because at the conclusion of the forward stroke the stud 97 will have been carried below the shoulder of the hook 96 so that the latter cannot reëngage under the stud even if the total key is released at the end of the forward stroke. In connection with the above described operation of transferring a total from the primary to the supplemental accumulator it must of course be assumed that the handle of the lever 90 is rearward so as to have the hook 91 disengaged from the stud 92.

To take a total or subtotal from the supplemental wheels a different set of mechanism necessarily comes into play. If the wheels are not already engaged with their racks (as would be the case at the conclusion of an operation which registered an amount in the lower accumulator wheels (Fig. 7ª) or which transferred an accumulation from the primary wheels to them,) it would be necessary to move the supplemental wheels into engagement with their racks at the outset of the operation for taking a total or subtotal from said wheels. This can obviously be accomplished by lowering the arm 74, Fig. 5, so as to carry the roller 76 past the point of the front end of the cam strip 77. In order to accomplish this a lever 190 is journaled upon the same stud as the hook 96 and equipped with a stud 191 overlying a raised edge 84ª of a plate 84 on the arm 74, and a key 192 is mounted upon the keyboard to the rear of the key 150 and has its stem 193 engaged with said lever 190. A spring 194 normally upholds said key. Depression of the latter has the effect of lowering the arm 74 (Fig. 10) carrying its roller 76 past the point of cam-strip 77, so that upon operation of the machine the latter will further lower said arm lifting the pinions 61 into engagement with their racks through the connections heretofore described. The aforesaid plate 84 is arranged longitudinally of the arm 74 against the left hand side thereof and is mounted thereon through slot and pin connections and drawn rearwardly by a spring 85. At the end of the forward stroke of the operating handle the stud 82 acting against the rear edge 87ª of an upward extension of the plate 84 thrusts said plate forward (see dotted lines Fig. 11) carrying its high forward edge 84ª past the stud 191 which permits the arm 74 to rise sufficiently to carry its roller 76 upwardly past the point of the rear end of the cam strip 77 as illustrated in Fig. 11. In so rising the arm 74 carries the said edge 87ª upwardly and beyond the stud 82, the latter entering the jaw of the plate 84, and it should be noted that the cam action of the stud 82 upon the upper inclined side 87 of a jaw of the plate 84 will insure the rise of the arm 74 so that reliance does not have to be placed wholly upon the spring 75. It will be obvious that under these conditions when the handle returns the cam strip 77 acting upon the roller 76 will through the connections described disengage the wheels from the racks leaving the wheels at zero. However, this should only take place when the key 192 is held down throughout the operation. Now the lever 190 has a downwardly and rearwardly projecting curved finger 193ª which, when the key 192 is depressed, takes up a position in the path of the upturned end of the bar or finger 80 so that as the handle reaches the end of its forward stroke said finger 80 will ride up on the finger 193 as illustrated in Fig. 11 putting the spring 81 under tension. If the key is then released while the handle remains forward said spring 81 will cause the stud 82 to act upon the lower side 86 of the jaw of the plate 84 and lower the arm 74 so as to carry its roller 76 below the point of the rear end of the cam strip 77, with the result that upon the return of the operating handle the wheels 61 remain in mesh with their racks.

It is desirable to distinguish the imprint of the total taken from the supplemental accumulator as well as that of the total taken from the primary accumulator and so provision is made for operating the key 150 and its connection by depression of the key 192, said connection including means for shifting an inking ribbon as hereinafter explained. To provide for operating the totaling connections of the key 150 by depression of the key 192 the lever 190 has a downwardly and rearwardly projecting curved finger 200 which acts upon the stud 180 to thrust the link 152 rearward upon depression of the key 192, thereby setting the ribbon shifting devices to provide for the printing of a total in a distinctive color. Of course this rearward thrust of said link has the same effect as before described in releasing the dog 155, yet it would not do to have the racks 8 engaged with primary accumulator wheels 9 during rotation of supplemental wheels 61 toward zero. To again disable said dog a horizontally arranged blade 202 (Fig. 30) is pivoted to the frame work adjacent the dog and adapted to be forced under the same upon depression of the key 192, thereby preventing the dog from engaging the teeth of the arm 156. This blade is connected by a link 203 (Fig. 3) with the depending spring-held arm 204 pivoted to the frame, said arm having a laterally turned finger 205 extending behind a collar 206 on the elimination rod 170. A lever 210 (Figs. 3, 29 and 31) loosely mounted upon the journal rod 113 of the wheels 9, Fig. 3, has a nose extending over a collar 211 on the elimination rod 170 and said lever is connected by a link 212 with an arm 213, Fig. 5, secured to the hub of the lever 190. It results that upon depression of the key 192 the lever 211 is rocked and the elimination rod 170 thrust downward, thereby swinging the arm 204 rearward and carrying the blade 202 under the dog 155 with the effect before described. Now if the key 192 is held down throughout the operation the effect of rocking the guard plate 158 by the downward and rearward thrust of the rod 170 would be the same as that before described, viz., to disengage the racks 8 from the wheels 9 as the handle starts rearward, said racks having been engaged with the wheels just at the close of the forward pull of the operating handle by the action of the stud 50′ upon the radius bar 47. Thus the primary wheels would be unaffected by the clearing of the supplemental wheels. However, should the key 192 be released with the handle forward, then of course unless the elimination key 172 was thereupon operated, to again displace the guard plate 158 the racks 8 would remain engaged with wheels 9 the dog 155 being prevented by the guard plate from acting on the arm 157 and in the back stroke of the handle the registration that was on the supplemental wheels would be transferred to the primary wheels.

The stopping of accumulator wheels at zero position in the taking of totals is accomplished in the familiar way by having transfer studs abut against transfer trip levers or pawls. Thus, in the case of the primary accumulator the studs 115 strike against the front straight edges of the trip levers 121 and in the case of the supplemental wheels the projections 105 strike against the straight shoulders of the pawls 106.

The ribbon shifting arrangement before mentioned comprises a frame 300 (Fig. 3) sliding forward and back upon rods 301 and carrying spools supporting the ribbon 302, this frame being connected by a link 304 with a crank arm 305 on a rock shaft 306 having a second crank arm 307 from which depends a pair of arms 308 and 309, (Figs. 29 and 32), the former terminating in a square end and the latter in a bifurcated end 310 embracing a stud 311 upon the link 152. The rock plate 140 has a forward bifurcated extension 313 which is adapted to receive a roller stud 314 upon the arm 309 when either of the total keys is depressed carrying the link 152 rearward, and swinging back said arm 309. Then when the handle is pulled and the plate 140 rocked the arm will be raised and the ribbon shifting connections above described operated to carry a red division of the ribbon over the line of type to be struck for the printing of the total. The said bifurcated forward extension of the rock plate 140 has a stud 315 which is adapted to act against the end of the arm 308 to operate the ribbon shifting connection to a less extent for the purpose of bringing over the line of type to be printed the middle section of the ribbon. This happens whenever the elimination rod 170 is thrust in unaccompanied by depression of the total key 192, i. e., when said rod is thrust in by use of the key 173 or as hereinafter described by lateral shift of the paper carriage. Upon said rod is a cam 316 shown as part of collar 211 which operates upon a stud of a bell crank lever 317 loosely mounted upon the cross rod 121ª and having a roller 318 engaging said arm 308. Inward thrust of the rod 170 by rocking said bell crank lever causes said arm to be swung rearward over the stud 315 and there is sufficient lost motion between the latter and the arm to make the ribbon shift less than when a total key is depressed.

It will be understood that normally the ribbon frame 300 is rearward with the forward section of the ribbon positioned to produce the printed impression and the color of the imprints made under such conditions will denote items registered in the primary accumulator whether with or without simultaneous registration in the supplemental accumulator. Items printed in the color of the middle section of the ribbon will denote numbers or amounts not registered in the primary accumulator whether or not such amounts may be registered in the supplemental accumulator. As before mentioned, imprints in the color (generally red) of the third section of the ribbon denote totals of either accumulator.

Passing now to the arrangement for automatically reciprocating the paper carriage, the mechanism for the most part is the same as that heretofore devised by me and shown and described in British Letters Patent No. 15532 of 1906 and so need not be specifically described. The lever designated 400, (Fig. 2), is identical with the lever designated J in said British Letters Patent and its rear end is similarly connected to a bifurcated arm 401 (Fig. 14) swinging transversely of the machine and secured to a rock shaft 402 which at its rear end carries an upstanding slotted arm 403, Fig. 14. Through the same sort of connections from the operating handle as disclosed in said British Letters Patent this slotted arm is vibrated in operations of the machine swinging first one way in one operation and the opposite way in the succeeding operation. In the construction shown in said patent the corresponding member engaged directly with the carriage. In the present instance the slotted arm 403 engages the stem of a knob 404 screwed into a bar 405 which is slidingly supported on brackets 406 rising from the casing of the machine, the bar being slotted to receive screws 407 entering said brackets. The upper edge of the bar is formed with a series of square notches 408 shown in the present instance equi-distantly spaced apart. In the end pieces of the carriage there is journaled a rock rod 409 which carries the ordinary means for differently positioning the carriage laterally without reference to the automatic reciprocating mechanism. On this rod there is journaled a sleeve 410 which carries affixed to it a finger 411 adapted to engage any one of the notches 408 thereby connecting the carriage to the reciprocating bar 405. By this arrangement an advantage is obtained over that shown in said British Letters Patent in that reciprocations of the carriage can be varied with reference to double column work from one side of the paper to the other. For example, if six columnar positions of the carriage are provided for the reciprocation can be between any two adjacent ones of such positions. It is desirable of course to not have the regular column-regulating devices interfere in any manner with the working of the so-called "shuttle" arrangement and to this end provision is made for requiring such device to be at a neutral adjustment before the finger 411 can be swung down into engagement with a notch 408. The rock rod 409 carries a sector 412 with a cam edge to provide for positioning the carriage at any irregular position by turning said rod and jamming the cam edge against a surface of the carriage-supporting bracket. In an edge adjacent such surface are formed a series of notches 413 and the aforesaid segment has a tooth 414 which may engage any one of said notches through rotation of the rod in a direction the reverse of that in which it is rotated to engage the cam edge with the aforesaid surface. The carriage may thus be positioned permanently at any one of several predetermined places. On the two ends of the rod 409 are handles 415 by which to rotate the rod in a direction to engage the cam edge of the segment with such surfaces and a spring 416 applied to the rod tends to rotate it in the opposite direction. There is a handle 417 secured to the sleeve 410 and having a laterally turned portion overlying one prong 420 of a rock piece 421 journaled on a stud in the right-hand side of the carriage and having another prong 422 on the opposite side of the center and extending under a pin 423, Fig. 18, which pin projects from a collar 424 secured to the rod 409. When the rock rod is in a position where the tooth 414 engages one of the notches 413 said pin 423 is holding down the prong 422 and the other prong 420 is engaged with the underside of the laterally turned portion of the handle 417 to the rear so that in order to turn the sleeve 410 and engage the finger 411 with one of the notches 408 it is necessary that the rock rod 409 be turned to disengage the tooth 414 from the notch 413. In order to maintain the neutral position of the rock rod when the shuttle mechanism is in operation a latch 430, Fig. 28, is pivoted upon the left end of the carriage and the handle 415 on the left end of the rock rod has a pin 431 adapted to be engaged by said latch as illustrated in said figure of the drawings.

In doing double column work it is frequently desired to eliminate from the accumulation the numbers or amounts printed in one of the columns and in the present instance provision is made for automatically accomplishing this at will by an adjustment which causes alternate actuation of the elimination rod 170. A lever 430 loose upon the cross rod 120, Fig. 3, has a nose engaging a collar 431 on said elimination rod and this lever is connected by a rod or wire 432 to a horizontally arranged bell crank lever 433 pivoted on the bottom of a pendent post 434. At the rear of the machine there is pivotally connected to this bell crank lever a bar 435 which is slotted near the opposite end to embrace a stud on an arm 436 secured to the rock shaft 402, the stud being connected by a spring 437 with said bar, all as shown in Fig. 14. When the carriage is moved to the right by the arm 403 said bar 435 will be drawn to the left through the spring connection in the absence of any obstruction and thus the bell crank lever 433 will be rocked and the lever 430 operated to force down the elimination rod, thereby excluding the number or amount from the primary set of accumulating wheels when the carriage is in right hand position for the printing of the amount or number in the left-hand column. When the carriage is moved back to the left for printing in the right hand column the bar 435 will obviously be drawn to the right and the elimination rod restored to normal so that an amount printed in the right-hand column will be accumulated in the primary wheels. If it is desired to accumulate amounts printed in both columns the rod 435 is put out of commission by holding it in the right-hand position so that when the carriage moves to the right the spring 437 will be stretched and the bar not moved. This is accomplished by engaging the notched arm of a bell crank lever 440 with a lug 441 on the bar. An arm of said lever protrudes through the casing of the machine at the back and the slot in which said arm works may have suitable inscriptions adjacent its ends as shown in Fig. 17 to index the positions of the arm.

Now it may be desired of course to separately accumulate the amounts in the two different columns and in a machine of the present invention which contains two sets of accumulating wheels provision is made for having the amounts, as printed first in one column and then in the other along the same horizontal line, alternately registered in the two sets of accumulating wheels. To this end a rod or wire 445 (Figs. 3 and 5) connected to the lever 430 runs forward to a point in front of the arm 95 controlling the supplemental accumulator. When the lever 440 is out of commission as illustrated in Fig. 14 and the latch 90 is also out of commission, the supplemental accumulator will accumulate alternate items, to-wit those printed in the left-hand column, by reason of the displacement of the arm 95 in every other operation of the machine.

In double column work such as above discussed it is desirable that in every other operation of the machine there be no line spacing, otherwise there would not be the desired horizontal alinement of the designating number and its corresponding amount or of two amounts added in different accumulators. Provision is therefore made for disabling the line spacing mechanism in every other operation of the machine. The line spacing devices comprise a pair of jaws 500 500ᵃ, one fixed and the other pivoted to the arm or lever 17, Fig. 3, and spring-held together and embracing the cross rod 501 of the feed bail which operates the line-spacing pawl 502, Fig. 28. If the bail is blocked obviously the jaws simply spread apart without effecting any line spacing. To block the bail in alternate operations there is journaled in a bracket on the casing a rock shaft 503, Fig. 19 having secured to it an arm 505 with an end portion 506 bent at right angles toward the bail 501 and adapted when the arm rises to block the bail as shown in Fig. 25. A spring 507 applied to said arm tends to raise it to this blocking position and does so raise it when the carriage is in the left-hand position, with the result that an amount or number having been printed in the right-hand column and the carriage shifted, no line spacing will take place. However, when the bar 405 shifts to the right a pin 510 secured to said bar strikes an arm 511 rotatively engaged with the rock shaft 503 with the result that the arm 505 is swung down to the position shown in Figs. 14 and 26, and the line-spacing mechanism permitted to operate when the handle is again pulled. Of course in single column work the line-spacing mechanism should come into play in each operation, hence provision is made for keeping the arm 505 displaced indefinitely. To this end a sleeve 513 is journaled on a longstud 514, Fig. 26, and equipped with a knob and also equipped with a cam 515 to act upon the said arm 505. It will be obvious that by turning this sleeve the cam can be brought to bear upon the arm to hold it in the displaced position shown in Figs. 15—36 thereby leaving the feed bail 501 free to oscillate.

The rock shaft 503 has a collar 516 integral or rigid with it and apertured as shown in Fig. 21 at two points about 45° apart, these apertures being designated by the numeral 517. Either may be engaged by a pin 518 which is secured in a knob 519 loose upon the reduced rear portion of said rock shaft and held forward by a spring 520 encircling the latter in a recess of the knob, the spring bearing at one end against the shoulder of the knob at the base of the recess and at the other end against a confining screw 521 entered in the end of the rock shaft, all as shown in Fig. 19. The arm 511 embraces a reduced portion of said knob next adjacent the aforesaid collar 516, and the pin 518 extends through said arm rotatively connecting it to the knob and also rotatively connecting it to the rock shaft when the knob is forward under actuation of its spring 520 as shown in Fig. 19. The purpose of this construction and the two apertures 517 in the collar 516 is to provide for positioning the arm 511 out of range of the pin or stud 510 in case it should be desired to keep the line spacing mechanism disabled during a series of operations of the machine, as for example, in printing a series of numbers or amounts in a horizontal line, the series exceeding two. In such case the knob 519 would be drawn out and turned to the left as the machine is viewed from the rear and the pin 518 engaged with the left hand aperture 517 as in Fig. 19. The turning of the knob swings the arm 511 to the left as the machine is viewed from the rear, taking said arm out of the range of movement of the pin or stud 510 so that notwithstanding the bar 405 reciprocates in each operation of the machine there would be no reënabling of the line spacing mechanism such as does take place in the manner already described when the pin 518 is engaged with the other aperture 517 as in Fig. 14.

The arm 511 is preferably equipped with a barrel 522 in which is slidingly fitted a friction block 523 (Figs. 17 and 24) said block being thrust forward by a spring 524 incased by the barrel and surrounding a stem 525 of the block, said stem being in the form of a screw entered in the block and sliding through the end of the barrel and having a head on the exterior of the latter. Said friction block by pressing against the face of the bar 405 serves to prevent accidental shifting of the arm 511.

The carriage equipment in the matter of permanent positioning either at predetermined positions or at irregular positions, as above described, has been made the subject of my prior Patent No. 1,065,887, issued June 24, 1913, which also discloses the latch for holding the rock rod at a neutral position, and description of these devices has been repeated here simply to make clear the relation between them and the additional devices which have to do with the shuttle action of the carriage.

Printing mechanism such as shown in my aforesaid prior Patent No. 1,050,041, issued Jan. 7, 1913, will be employed in the machine of the present invention to provide for variably suspending coöperative action of the hammers 600 which are driven against the types 13 in the usual way to effect percussive action of such type against the platen 700 in the form of a roller journaled in a cradle 701 which is pivoted to the carriage 14. I also propose in the machine of the present invention to include mechanism such as disclosed in my prior Patent No. 1,049,921, issued Jan. 7, 1913, designed for the purpose of variably discontinuing engagement between racks 8 and wheels 9 when certain banks of amount keys at the left are in use for setting up designating numbers or the like where accumulation is not called for, the arrangement in this connection providing for the utilization of wheels 9 corresponding with such banks for the purpose of extending the total being accumulated by the balance of the wheels. When a total is to be printed after use of the machine in this way it is of course necessary that the disabled racks be restored to normal for the purpose of coöperating with their wheels in the setting up of the extended portion of the total. The means employed to such end in the machine here shown vary somewhat from the corresponding means disclosed in said prior patents and therefore have been illustrated in the accompanying drawings and will be specifically described.

In Fig. 3 the numeral 800 designates an arm affixed to the total key link 152 and extending in front of a lever 801 which is pivoted on the under side of a supporting plate 802 (Figs. 33—35). This lever corresponds with the lever designated 97 in said prior patent and coöperates with the plate 803 corresponding with the plate designated 91 in said prior patent. This plate 803 acts as does said plate 91 to restore the laterally displaced racks by the action of lugs 804 against pins 805 which straddle the racks. Fig. 33 illustrates the normal condition in which the left-hand end of the lever 801 is drawn forward against a stop pin 806 by a spring 807 connecting the other arm of the lever with the plate 803. This other arm of the lever has a cam edge 808 which operates upon the rounded end of a forward extension 809 of the plate 803, the rise of the cam normally standing in rear of said rounded end. Pins 805 are normally spaced from the lugs 804 but when the adjustment is made to provide for disabling said racks one or more of the levers 810 carrying the pins are shifted as fully set forth in said prior patent so that the condition is then as illustrated in Fig. 34, i. e. the left-hand pins 805 of said shifted levers are brought adjacent the associated lugs 804. When the total key is depressed thrusting the link 152 rearward the arm or finger 800 thrusts the left-hand end of the lever 801 rearward carrying its right-hand end forward, as illustrated in Fig. 35 causing the cam 808 to force the plate 803 to the right, thereby causing the lugs 804 to act upon the pins 805 and restore the shifted levers 810 to normal, thus bringing the displaced racks back into line with the corresponding accumulator wheels. A gravity latch 812 is employed like that designated 98 in said prior patent, but said latch instead of engaging the lever 801 as it engages the lever 97 in the construction of said prior patent for the purpose of holding the plate 803 to the shifted position throughout the operation of the machine, engages the plate itself, the latter being formed with a lug 813 for the purpose. The latch is normally upheld by a lever 814, Fig. 3, pivoted upon the rock shaft 132, and upheld as to its forward end by a spring 815. The rear end of said lever engages a roller stud 816 on the cam sector 141 and at the outset of an operation the lever is rocked by said roller so as to release the latch 812. Normally the latch would then simply drop on top of the lug 813, but when either total key has been depressed and the plate 803 thereby thrust to the right, the latch will drop in front of said lug as illustrated in Fig. 35 so as to hold the restored racks in alinement with their accumulating wheels throughout the operation, which is important when it is considered that the total key may be released in the middle of an operation for the taking of a subtotal and the racks should nevertheless remain in line with their wheels.

A machine such as that above described is capable of a very great variety of operations all of which need not be detailed. It will suffice to describe briefly a limited number of kinds of work of which the machine is capable as such work is illustrated in Figs. 36 to 42. Fig. 36 merely illustrates how the machine can be used when desired without bringing into play the features which characterize the present invention and there is here represented a portion of a strip of paper on which two columns are printed, the left-hand one made up of designating numbers not accumulated and the right-hand column of accumulated amounts with the total extending to the left beyond the highest decimal point of the right-hand column. In this connection mechanism such as illustrated in my aforesaid prior Patent No. 1,049,921, and the mechanism illustrated in Figs. 33 to 35 of the accompanying drawings come into play. The knob 900, Fig. 1, is adjusted to cause suspension of coöperative action of impression devices between the fourth and fifth banks counting from the left and the knob 901 correspondingly adjusted to provide for discontinuance of coöperative action between a similar number of racks 8 and wheels 9 during the itemizing. When the total is struck such racks are restored to coöperative relation with such wheels so that the total will be printed as shown in Fig. 36. It will be understood that both the amount to be accumulated and its designating number in this kind of work will be set up at the same time upon the keyboard. Fig. 37 represents another kind of work which can be done upon the machine without calling into play features characterizing the present invention but utilizing the shuttle mechanism of the aforesaid British Patent No. 15,532, this figure of the drawings illustrating a portion of a sheet of paper upon which are printed two parallel columns each running to the full keyboard capacity of the machine with a total below the right-hand column only. While this kind of work does not necessarily call into play features characterizing the present invention, yet it is to be understood that the feature hereinbefore described which provides for alternating between any two of a considerable number of columnar positions may be brought into play in this connection. In this example the left-hand column is to be understood as made up of designating numbers requiring no accumulation so that the shuttle mechanism may be considered to have been in operation without causing accumulation on the supplemental wheels but the numbers simply excluded from the primary wheels. Of course in such shuttle work the supplemental accumulator eliminating hook 95 would be displaced in each operation of the machine which printed a number in the left-hand column inasmuch as the lever 440 would necessarily be adjusted to the elimination position in order to exclude from the primary accumulator the numbers of the left-hand column. However, this would not result in accumulation of those numbers in the supplemental accumulator for the reason that in doing such work as illustrated in Fig. 37 the supplemental accumulator eliminating key or lever 90 would be adjusted to hold up the arm 74 as illustrated in Fig. 3. Shifting said lever 90 will put the machine in condition to accumulate alternately in the primary and supplemental accumulators, producing work such as illustrated in Fig. 38. Here a portion of a trial balance sheet is illustrated with credit items listed in the right-hand column and debit items listed in the left-hand column. The credit items would be added in the primary accumulator and the debit items in the supplemental accumulator. In striking the two totals it would be preferable to take the total of the supplemental accumulator first because this would require no manipulation other than holding down the total key 192 throughout the operation of the machine and then the carriage having been shifted the only further manipulation necessary would be to hold down the total key 150 throughout an operation. Of course the primary accumulator total might be taken first but in such case the lever 90 would have to be manipulated in order to prevent a transfer of the total to the supplemental accumulator and then in order to get the total of the latter said lever would have to be shifted again. In this example it is assumed that the carriage is moved back and forth by hand. If debit and credit items alternated, then the shuttle mechanism would be utilized and if the last item recorded was in the credit column and a total was to be struck first of the debit items, a blank stroke of the operating handle should be taken in order to bring the carriage to the proper position for printing a total at the foot of the debit column. At the conclusion of the operation of printing such total the carriage would have been shifted back again into proper position for the printing of the total at the foot of the credit column.

Fig. 39 represents cross-footing and grand totaling. Here amounts are successively printed in a horizontal row and accumulated on the primary set of wheels and the total printed along the same line, and transferred to the supplemental wheels leaving the primary wheels clear. This procedure can be repeated as required by the work in hand.

Figures 40, 41, 42:
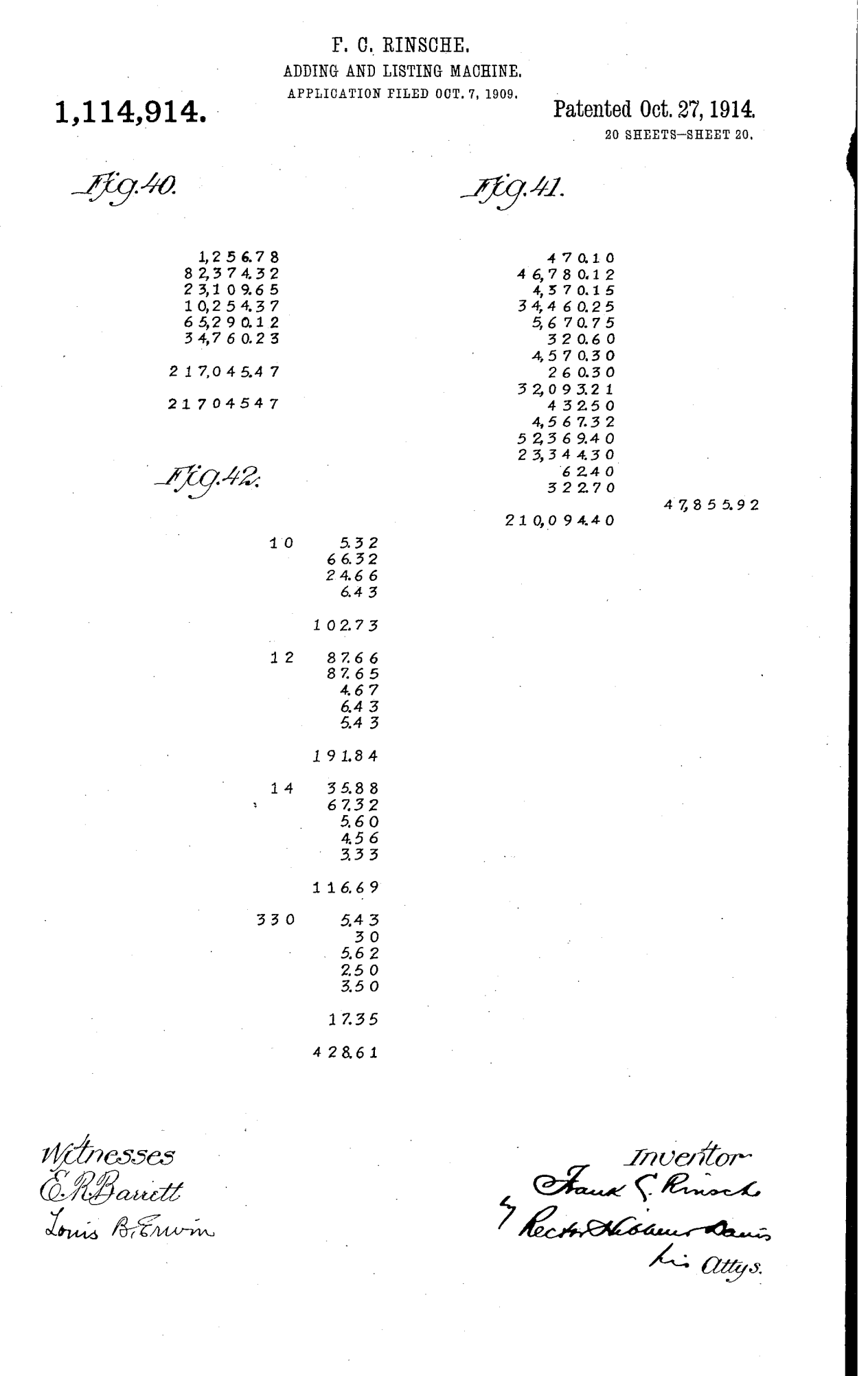

Then at any time the grand total can be taken from the supplemental wheels and printed below the column of totals as shown. Fig. 40 represents listing of amounts such as those of bank checks, accumulating in both accumulators and striking a total from each for verification purposes. Fig. 41 represents listing of bank checks all accumulated in the primary accumulator but certain selected items, as for example the checks of one depositor, also accumulated in the supplemental accumulator, and a total of such selected items printed in addition to the grand total. In such a case, assuming that the first item was not one of the selected ones, the work would start with the lever 90 forward and the button 101 back. Then when a selected item was reached the lever 90 would be thrown back and the button 101 drawn forward, with the result that such selected item would be accumulated in both accumulators. Then, if the next item was not a selected one the lever 90 and button 101 would be restored to their original positions. It is not essential that lever 90 be forward in adding the items in the primary accumulator alone for the hook 95 would prevent addition in the supplemental accumulator, but if a total is first struck of all the items this lever 90 must be forward in order to prevent such total being transferred to the supplemental accumulator, obliterating the special total thereon. However, if the special total, i. e. the total of the selected items is first taken, then said lever 90 need not be forward when the main total is afterward struck, transfer of that total to the supplemental accumulator doing no harm.

Fig. 43 represents work such as might be required of a machine in a mercantile establishment where sales were being registered and recorded as made by different clerks identified by designating numbers and the individual totals of whose sales might be desired as well as a grand total of all sales. In such case the knob 900 would be adjusted to provide for printing the designating numbers of the clerks without following ciphers. The identifying number of a clerk having been printed and several sales recorded and accumulated in the primary accumulator, the button 101 being at the rear position, the total of such sales would be struck by depressing the key 150 and holding the same down throughout the operation so as to clear the primary accumulator to make ready for accumulation of sales of another clerk. In this operation the lever 90 would be at the rear position, so as to cause the accumulation to be transferred to the supplemental accumulator. Then the identifying number of another clerk would be printed and his sales recorded and registered in the primary accumulator and the same operation repeated for clearing the latter and transferring the total to the supplemental accumulator to be added to the total previously transferred thereto. This same work could be otherwise taken care of as by simultaneously accumulating the items in both accumulators and then clearing the primary accumulator with the lever 90 forward so as to leave the supplemental accumulator unaffected and then resuming the simultaneous accumulation.

What is claimed is:

1. In a machine of the character described, the combination of two sets of adding wheels and transfer or carrying mechanisms, and means for accumulating successive amounts on both sets of wheels simultaneously, with provisions for taking totals from either independently of the other, for eliminating items from either, and for transferring accumulations from one to the other.

2. In a machine of the character described, the combination of two sets of adding wheels and transfer or carrying mechanisms, and means for accumulating successive amounts on both sets of wheels simultaneously, with provisions for accumulating on one to the exclusion of the other, for taking totals from either independently of the other, and for transferring accumulations from one to the other.

3. In a machine of the character described, the combination of two sets of adding wheels and transfer or carrying mechanisms, means for accumulating successive amounts on one set of wheels, and means for simultaneously accumulating any one or more of the items at will on the other set of wheels.

4. In a machine of the character described, the combination of two sets of adding wheels, setting up and actuating means therefor and controlling devices causing said sets of adding wheels to automatically alternate in receiving items set up.

5. In a machine of the character described, the combination of two sets of adding wheels, setting up and actuating means therefor, printing mechanism, a shiftable paper carriage, means for shifting the latter first one way and then the other automatically, and means causing the said sets of adding wheels to automatically alternate in receiving items set up.

6. In a machine of the character described, the combination of two corresponding series of accumulating wheels, a set of actuators common thereto and having two sets of racks, one for each set of wheels, and one of said sets of racks being mounted for single step movements of individual racks relative to their actuators, setting up devices common to both series of wheels, and transfer mechanisms for said series of wheels, the mechanism for one series differing in principle of operation from that for the other series in comprising devices controlling single step movements of racks relative to actuators while said racks are engaged with the accumulating wheels, whereas the transfer mechanism for the other set of wheels effects movement thereof while the same are disengaged from their racks.

7. In a machine of the character described, the combination of reciprocating actuators; setting-up devices for variously regulating excursions thereof; two sets of accumulator wheels engageable with and disengageable from said actuators, the latter normally advancing disengaged from both sets of wheels and returning engaged therewith; means for preventing at will engagement between actuators and one set of wheels or the other in return movement of the actuators, and means for causing engagement between either set of wheels and the actuators in the advance of the latter, such means associated with one set of wheels operating to disable the means associated with the other which prevents the latter's engagement with the actuators during return of the same.

8. In a machine of the character described, the combination of reciprocating actuators; setting-up devices for variously regulating excursions thereof; two sets of accumulator wheels engageable with and disengageable from said actuators, the latter normally advancing disengaged from both sets of wheels and returning engaged therewith; means for preventing at will engagement between actuators and one set of wheels or the other in return movement of the actuators, and means for causing engagement between either set of wheels and the actuators in the advance of the latter, such means associated with one set of wheels operating to disable the means associated with the other which prevents the latter's engagement with the actuators during return of the same, additional means being provided to prevent such engagement at will.

9. In a machine of the character described, the combination of reciprocating actuators; setting-up devices for variously regulating excursions thereof; two sets of accumulator wheels engageable with and disengageable from said actuators, the latter normally advancing disengaged from both sets of wheels and returning engaged therewith; means for preventing at will engagement between actuators and one set of wheels or the other in return movement of the actuators, and means for causing engagement between either set of wheels and the actuators in the advance of the latter, such means associated with one set of wheels operating the means associated with the other but with provision for disabling the latter as to its causing engagement between the other set of wheels and the actuators during advance of the latter; together with printing mechanism including means for specially characterizing totals, such means rendered effective by operation of either means which causes engagement of one set of wheels or the other with the actuators during the latter's advance.

10. In a machine of the character described, the combination of reciprocating actuators; setting-up devices for variously regulating excursions thereof; two sets of accumulator wheels engageable with and disengageable from said actuators, the latter normally advancing disengaged from both sets of wheels and returning engaged therewith; means for preventing at will engagement between actuators and one set of wheels or the other in return movement of the actuators, and means for automatically bringing into action such latter means associated with one set of wheels in every other reciprocation of the actuators.

11. In a machine of the character described, the combination of reciprocating actuators; setting-up devices for variously regulating excursions thereof; two sets of accumulator wheels engageable with and disengageable from said actuators, the latter normally advancing disengaged from both sets of wheels and returning engaged therewith; means for preventing at will engagement between actuators and one set of wheels or the other in return movement of the actuators; means for automatically bringing into action such latter means associated with one set of wheels in every other reciprocation of the actuators, and simultaneously disabling such means applied to the other set of wheels.

12. In a machine of the character described, the combination of reciprocating actuators; setting-up devices for variously regulating excursions thereof; two sets of accumulator wheels engageable with and disengageable from said actuators, the latter normally advancing disengaged from both sets of wheels and returning engaged therewith; means for preventing at will engagement between actuators and one set of wheels or the other in return movement of the actuators; a laterally shiftable paper carriage; means for reciprocating the same; and means actuated by said reciprocating means operating to bring into action the means for preventing engagement between one set of wheels and the actuators during return movement of the latter.

13. In a machine of the character described, the combination of reciprocating actuators; setting-up devices for variously regulating excursions thereof; two sets of accumulator wheels engageable with and disengageable from said actuators, the latter normally advancing disengaged from both sets of wheels and returning engaged therewith; means for preventing at will engagement between actuators and one set of wheels or the other in return movement of the actuators; a laterally shiftable paper carriage; means for reciprocating the same; and means actuated by said reciprocating means operating to bring into action the means for preventing engagement between one set of wheels and the actuators during return movement of the latter and also operating to disable the means for preventing engagement between the other set of wheels and the actuators.

14. In a machine of the character described, the combination of reciprocating actuators; setting-up devices for variously regulating excursions thereof; two sets of accumulator wheels engageable with and disengageable from said actuators, the latter normally advancing disengaged from both sets of wheels and returning engaged therewith; means for preventing at will engagement between actuators and one set of wheels or the other in return movement of the actuators; a laterally shiftable paper carriage; means for reciprocating the same; means actuated by said reciprocating means operating to bring into action the means for preventing engagement between one set of wheels and the actuators during return movement of the latter and a manipulative device for disabling at will said means so actuated by the carriage reciprocating means.

15. In a machine of the character described, the combination of reciprocating actuators; setting-up devices for variously regulating excursions thereof; two sets of accumulator wheels engageable with and disengageable from said actuators, the latter normally advancing disengaged from both sets of wheels and returning engaged therewith; means for preventing at will engagement between actuators and one set of wheels or the other in return movement of the actuators; a laterally shiftable paper carriage; means for reciprocating the same; means actuated by said reciprocating means operating to bring into action the means for preventing engagement between one set of wheels and the actuators during return movement of the latter and also operating to disable the means for preventing engagement between the other set of wheels and the actuators; and a manipulative device for disabling at will said means so actuated by the carriage reciprocating means.

16. In a machine of the character described, the combination of reciprocating actuators; setting-up devices for variously regulating excursions thereof; two sets of accumulator wheels engageable with and disengageable from said actuators, the latter normally advancing disengaged from both sets of wheels and returning engaged therewith; a key and connections for preventing at will engagement between one set of wheels and the actuators during return of the latter; a key and connections for preventing at will engagement between the other set of wheels and the actuators during return of the latter; and means for automatically operating said connections of one key in every other reciprocation of the actuators.

17. In a machine of the character described, the combination of reciprocating actuators; setting-up devices for variously regulating excursions thereof; two sets of accumulator wheels engageable with and disengageable from said actuators, the latter normally advancing disengaged from both sets of wheels and returning engaged therewith; a key and connections for preventing at will engagement between one set of wheels and the actuators during return of the latter; a key and connections for preventing at will engagement between the other set of wheels and the actuators during return of the latter; and means for automatically operating said connections of one key in every other reciprocation of the actuators, and simultaneously disabling the other key-connections.

18. In a machine of the character described, the combination of reciprocating actuators; setting-up devices for variously regulating excursions thereof; two sets of accumulator wheels engageable with and disengageable from said actuators, the latter normally advancing disengaged from both sets of wheels and returning engaged therewith; a key and connections for preventing at will engagement between one set of wheels and the actuators during return of the latter; a key and connections for preventing at will engagement between the other set of wheels and the actuators during return of the latter; a laterally shiftable paper carriage; means for reciprocating the same; and means actuated by said reciprocating means operating to bring into action said connections of one key.

19. In a machine of the character described, the combination of reciprocating actuators; setting-up devices for variously regulating excursions thereof; two sets of accumulator wheels engageable with and disengageable from said actuators, the latter normally advancing disengaged from both sets of wheels and returning engaged therewith; a key and connections for preventing at will engagement between one set of wheels and the actuators during return of the latter; a key and connections for preventing at will engagement between the other set of wheels and the actuators during return of the latter; a laterally shiftable paper carriage; means for reciprocating the same; and means actuated by said reciprocating means operating to bring into action said connections of one key and disable the connections of the other key.

20. In a machine of the character described, the combination of reciprocating actuators; setting-up devices for variously regulating excursions thereof; two sets of accumulator wheels engageable with and disengageable from said actuators, the latter normally advancing disengaged from both sets of wheels and returning engaged therewith; a key and connections for preventing at will engagement between one set of wheels and the actuators during return of the latter; a key and connections for preventing at will engagement between the other set of wheels and the actuators during return of the latter; means for automatically operating said connections of one key in every other reciprocation of the actuators and simultaneously disabling the other key-connections; and additional manipulative means for preventing engagement between the actuators and the set of wheels to which said last-mentioned key-connections pertain.

21. In a machine of the character described, the combination of reciprocating actuators; setting-up devices for variously regulating excursions thereof; two sets of accumulator wheels engageable with and disengageable from said actuators, the latter normally advancing disengaged from both sets of wheels and returning engaged therewith; a key and connections for preventing at will engagement between one set of wheels and the actuators during return of the latter; a key and connections for preventing at will engagement between the other set of wheels and the actuators during return of the latter; a laterally shiftable paper carriage; means for reciprocating the same; means actuated by said reciprocating means operating to bring into action said connections of one key and disable the connections of the other key; and additional manipulative means for preventing engagement between the actuators and the set of wheels to which said last-mentioned key-connections pertain.

22. In a machine of the character described, the combination of reciprocating actuators; setting-up devices for variously regulating excursions thereof; two sets of accumulator wheels engageable with and disengageable from said actuators, the latter normally advancing disengaged from both sets of wheels and returning engaged therewith; means for preventing at will engagement between actuators and one set of wheels or the other in return movement of the actuators; a key and connections for causing engagement between one set of wheels and the actuators in the advance of the latter; a key and connections for causing engagement between the other set of wheels and the actuators during the advance of the latter; means whereby one such key and connections operates the means for preventing engagement between the actuators and the wheels to which the other key and connections pertain during return of the actuators; and means whereby the last-mentioned key and connections disable the means for preventing engagement between the other set of wheels and the actuators during return of the latter.

23. In a machine of the character described, the combination of reciprocating actuators; setting-up devices for variously regulating excursions thereof; two sets of accumulator wheels engageable with and disengageable from said actuators, the latter normally advancing disengaged from both sets of wheels and returning engaged therewith; means for preventing at will engagement between actuators and one set of wheels or the other in return movement of the actuators; a key and connections for causing engagement between one set of wheels and the actuators in the advance of the latter; a key and connections for causing engagement between the other set of wheels and the actuators during the advance of the latter; means whereby one such key and connections operates the means for preventing engagement between the actuators and the wheels to which the other key and connections pertain during return of the actuators; means whereby the last-mentioned key and connections disable the means for preventing engagement between the other set of wheels and the actuators during return of the latter; and additional manipulative means for preventing such latter engagement.

24. In a machine of the character described, the combination of reciprocating actuators; setting-up devices for variously regulating excursions thereof; two sets of accumulator wheels engageable with and disengageable from said actuators, the latter normally advancing disengaged from both sets of wheels and returning engaged therewith; means for preventing at will engagement between actuators and one set of wheels or the other in return movement of the actuators; means for automatically bringing into action such latter means applied to one set of wheels in every other reciprocation of the actuators; a key and connections for causing engagement between one set of wheels and the actuators in the advance of the latter; a key and connection for causing engagement between the other set of wheels and the actuators during the advance of the latter; means whereby one such key and connections operates the means for preventing engagement between the actuators and the wheels to which the other key and connection pertain during return of the actuators; and means whereby the last mentioned key and connections disable the means for preventing engagement between the other set of wheels and the actuators during return of the latter.

25. In a machine of the character described, the combination of reciprocating actuators; setting-up devices for variously regulating excursions thereof; two sets of accumulator wheels engageable with and disengageable from said actuators, the latter normally advancing disengaged from both sets of wheels and returning engaged therewith; means for preventing at will engagement between actuators and one set of wheels or the other in return movement of the actuators; means for automatically bringing into action such latter means applied to one set of wheels in every other reciprocation of the actuators, and simultaneously disabling such means applied to the other set of wheels; a key and connections for causing engagement between one set of wheels and the actuators in the advance of the latter; a key and connections for causing engagement between the other set of wheels and the actuators during the advance of the latter; means whereby one such key and connections operates the means for preventing engagement between the actuators and the wheels to which the other key and connections pertain during return of the actuators; and means whereby the last-mentioned key and connections disable the means for preventing engagement between the other set of wheels and the actuators during return of the latter.

26. In a machine of the character described, the combination of reciprocating actuators; setting-up devices for variously regulating excursions thereof; two sets of accumulator wheels engageable with and disengageable from said actuators, the latter normally advancing disengaged from both sets of wheels and returning engaged therewith; means for preventing at will engagement between actuators and one set of wheels or the other in return movement of the actuators; a laterally shiftable paper carriage; means for reciprocating the same; means actuated by said reciprocating means operating to bring into action the means for preventing engagement between one set of wheels and the actuators during return movement of the latter; a key and connections for causing engagement between one set of wheels and the actuators in the advance of the latter; a key and connections for causing engagement between the other set of wheels and the actuators during the advance of the latter; means whereby one such key and connections operates the means for preventing engagement between the actuators and the wheels to which the other key and connections pertain during return of the actuators; and means whereby the last mentioned key and connections disable the means for preventing engagement between the other set of wheels and the actuators during return of the latter.

27. In a machine of the character described, the combination of reciprocating actuators; setting-up devices for variously regulating excursions thereof; two sets of accumulator wheels engageable with and disengageable from said actuators, the latter normally advancing disengaged from both sets of wheels and returning engaged therewith; means for preventing at will engagement between actuators and one set of wheels or the other in return movement of the actuators; a laterally shiftable paper carriage; means for reciprocating the same; means actuated by said reciprocating means operating to bring into action the means for preventing engagement between one set of wheels and the actuators during return movement of the latter and also operating to disable the means for preventing engagement between the other set of wheels and the actuators; a key and connections for causing engagement between one set of wheels and the actuators in the advance of the latter; a key and connections for causing engagement between the other set of wheels and the actuators during the advance of the latter; means whereby one such key and connections operates the means for preventing engagement between the actuators and the wheels to which the other key and connections pertain during return of the actuators; and means whereby the last mentioned key and connections disable the means for preventing engagement between the other set of wheels and the actuators during return of the latter.

28. In a machine of the character described, the combination of reciprocating actuators; setting-up devices for variously regulating excursions thereof; two sets of accumulator wheels engageable with and disengageable from said actuators, the latter normally advancing disengaged from both sets of wheels and returning engaged therewith; a key and connections for preventing at will engagement between one set of wheels and the actuators during return of the latter; a key and connections for preventing at will engagement between the other set of wheels and the actuators during return of the latter; means for automatically operating said connections of one key in every other reciprocation of the actuators; a key and connections for causing engagement between one set of wheels and the actuators in the advance of the latter; a key and connections for causing engagement between the other set of wheels and the actuators during the advance of the latter; means whereby one such last-mentioned key and connections operates the key-connections for preventing engagement between the actuators and the wheels to which the other such key and connections pertain during return of the actuators; and means whereby the last-mentioned key and connections disable the key-connections for preventing engagement between the other set of wheels and the actuators during the return of the latter.

29. In a machine of the character described, the combination of reciprocating actuators; setting-up devices for variously regulating excursions thereof; two sets of accumulator wheels engageable with and disengageable from said actuators, the latter normally advancing disengaged from both sets of wheels and returning engaged therewith; a key and connections for preventing at will engagement between one set of wheels and the actuators during return of the latter; a key and connections for preventing at will engagement between the other set of wheels and the actuators during return of the latter; means for automatically operating said connections of one key in every other reciprocation of the actuators; a key and connections for causing engagement between one set of wheels and the actuators in the advance of the latter; a key and connections for causing engagement between the other set of wheels and the actuators during the advance of the latter; means whereby one such last-mentioned key and connections operates the key-connections for preventing engagement between the actuators and the wheels to which the other such key and connections pertain during return of the actuators; means whereby the last-mentioned key and connections disable the key-connections for preventing engagement between the other set of wheels and the actuators during the return of the latter; and additional manipulative means for preventing such latter engagement.

30. In a machine of the character described, the combination of reciprocating bars; racks thereon; pinions movable into and out of engagement with said racks; a pivoted arm or lever and connections for so moving said pinions; a cam-sector for vibrating said lever; a hook engaging the lever to prevent its actuation by said sector; a key for displacing said hook; another set of racks on the bars; another set of wheels or pinions engageable with and disengageable from said other set of racks; and controlling devices for varying the order of engagement and disengagement between the latter and their wheels and operating to displace the before-mentioned hook.

31. In a machine of the character described, the combination of reciprocating bars; racks thereon; pinions movable into and out of engagement with said racks; a pivoted arm or lever and connections for so moving said pinions; a cam-sector for vibrating said lever; a hook engaging the lever to prevent its actuation by said sector; a key for displacing said hook; another set of racks on the bars; another set of wheels or pinions engageable with and disengageable from said other set of racks; and controlling devices for varying the order of engagement and disengagement between the latter and their wheels and between the first-mentioned racks and pinions and operating to displace the before-mentioned hook.

32. In a machine of the character described, the combination of reciprocating bars; racks therein; pinions movable into and out of engagement with said racks; a pivoted arm or lever and connections for so moving said pinions; a cam-sector for vibrating said lever; a hook engaging the lever to prevent its actuation by said sector; a key for displacing said hook; another set of racks on the bars; another set of wheels or pinions engageable with and disengageable from said other set of racks; and a total key and connections for varying the order of engagement and disengagement between the latter and their racks and operating to displace the aforesaid hook.

33. In a machine of the character described, the combination of reciprocating bars; racks thereon; pinions movable into and out of engagement with said racks; a pivoted arm or lever and connections for so moving said pinions; a cam-sector for vibrating said lever; a hook engaging the lever to prevent its actuation by said sector; a key for displacing said hook; another set of racks on the bars; another set of wheels or pinions engageable with and disengageable from said other set of racks; controlling devices for varying the order of engagement and disengagement between the latter and their wheels and operating to displace the before mentioned hook; and a total key and connections operating to displace said hook and shift the before-mentioned lever.

34. In a machine of the character described, the combination of reciprocating bars; racks thereon; pinions movable into and out of engagement with said racks; a pivoted arm or lever and connections for so moving said pinions; a cam-sector for vibrating said lever; a hook engaging the lever to prevent its actuation by said sector; a key for displacing said hook; another set of racks on the bars; another set of wheels or pinions engageable with and disengageable from said other set of racks; a total key and connections for varying the order of engagement and disengagement between the latter and their racks and operating to displace the aforesaid hook; and a total key and connections operating to displace said hook and shift the before-mentioned lever.

35. In a machine of the character described, the combination of reciprocating bars; racks thereon; pinions movable into and out of engagement with said racks; a pivoted arm or lever and connections for so moving said pinions; a cam-sector for vibrating said lever; a hook engaging the lever to prevent its actuation by said sector; a key for displacing said hook; another set of racks on the bars; another set of wheels or pinions engageable with and disengageable from said other set of racks; controlling devices for varying the order of engagement and disengagement between the latter and their wheels and operating to displace the before-mentioned hook; and a total key and connections operating to displace said hook and shift the before-mentioned lever and prevent engagement between the second-mentioned wheels or pinions and their racks during return movement of the bars carrying the latter.

36. In a machine of the character described, the combination of reciprocating bars; racks thereon; pinions movable into and out of engagement with said racks; a pivoted arm or lever and connections for so moving said pinions; a cam-sector for vibrating said lever; a hook engaging the lever to prevents its actuation by said sector; a key for displacing said hook; another set of racks on the bars; another set of wheels or pinions engageable with and disengageable from said other set of racks; means for preventing engagement between the latter and their wheels; and means for displacing the aforesaid hook automatically in every other reciprocation of the rackbars and simultaneously operating the means for preventing engagement between the second-mentioned wheels or pinions and their racks.

37. In a machine of the character described, the combination of reciprocating bars; racks thereon; pinions movable into and out of engagement with said racks; a pivoted arm or lever and connections for so moving said pinions; a cam-sector for vibrating said lever; a hook engaging the lever to prevent its actuation by said sector; a key for displacing said hook; another set of racks on the bars; another set of wheels or pinions engageable with and disengageable from said other set of racks; controlling devices for varying the order of engagement and disengagement between the latter and their wheels and operating to displace the before-mentioned hook; and a second hook adapted to be engaged with the lever at will; substantially as and for the purpose described.

38. In a machine of the character described, the combination of reciprocating bars; racks thereon; pinions movable into and out of engagement with said racks; a pivoted arm or lever and connections for so moving said pinions; a cam-sector for vibrating said lever; a hook engaging the lever to prevent its actuation by said sector; a key for displacing said hook; another set of racks on the bars; another set of wheels or pinions engageable with and disengageable from said other set of racks; means for preventing engagement between the latter and their wheels; means for displacing the aforesaid hook automatically in every other reciprocation of the rack-bars and simultaneously operating the means for preventing engagement between the second-mentioned wheels or pinions and their racks; and a second hook adapted to be engaged at will with the aforesaid pivoted arm or lever; substantially as and for the purpose described.

39. In a machine of the character described, the combination of reciprocating bars; racks therein; pinions movable into and out of engagement with said racks; a pivoted arm or lever and connections for so moving said pinions; a cam-sector for vibrating said lever; a hook engaging the lever to prevent its actuation by said sector; a key for displacing said hook; another set of racks on the bars; another set of wheels or pinions engageable with and disengageable from said other set of racks; means for preventing engagement between the latter and their wheels; means for displacing the aforesaid hook automatically in every other reciprocation of the rack-bars and simultaneously operating the means for preventing engagement between the second-mentioned wheels or pinions and their racks; and controlling devices for varying the order of engagement and disengagement between the latter and their wheels and operating to displace the before-mentioned hook.

40. In a machine of the character described, the combination of reciprocating bars; racks thereon; pinions movable into and out of engagement with said racks; a pivoted arm or lever and connections for so moving said pinions; a cam-sector for vibrating said lever; a hook engaging the lever to prevent its actuation by said sector; a key for displacing said hook; another set of racks on the bars; another set of wheels or pinions engageable with and disengageable from said other set of racks; means for preventing engagement between the latter and their wheels; means for displacing the aforesaid hook automatically in every other reciprocation of the rack-bars and simultaneously operating the means for preventing engagement between the second-mentioned wheels or pinions and their racks; controlling devices for varying the order of engagement and disengagement between the latter and their wheels and operating to displace the before-mentioned hook; and a second-hook adapted to be engaged at will with the aforesaid pivoted arm or lever; substantially as and for the purpose described.

41. In a machine of the character described, the combination of reciprocating bars carrying two sets of racks; two sets of wheels engageable with and disengageable from said sets of racks respectively; means for controlling one set of racks comprising a link and radius bars with notched arms; an oscillating member adapted to alternately throw the radius bars, and having a dog to engage the said notched arms; a link having a pin normally obstructing said dog; a guard plate to normally prevent action of the dog on the other radius bar, said guard plate engaged by said link; a total key connected to wheels engageable with and disengageable the latter; a second total key to effect engagement between the other racks and their wheels during advance of the reciprocating bars, said second total key arranged to actuate the aforesaid link which releases the dog and displaces the guard plate; and means operated by said second key to again disable the dog.

42. In a machine of the character described, the combination of reciprocating bars carrying two sets of racks; two sets of wheels engageable with and disengageable from said sets of racks respectively; means for controlling one set of racks comprising a link and radius bars with notched arms; an oscillating member adapted to alternately throw the radius bars, and having a dog to engage the said notched arms; a link having a pin normally obstructing said dog; a guard plate to normally prevent action of the dog on the other radius bar, said guard plate engaged by said link; a total key connected to the latter; a second total key to effect engagement between the other racks and their wheels during advance of the reciprocating bars, said second total key arranged to actuate the aforesaid link which releases the dog and displaces the guard-plate; a blade for disabling the dog; a rod for displacing the guard plate; an arm swung by said rod and operatively connected to the said blade; and connections from the second total key to operate the rod.

43. In a machine of the character described, the combination of reciprocating bars carrying two sets of racks; two sets of wheels engageable with and disengageable from said sets of racks respectively; means for controlling one set of racks comprising a link and radius bars with notched arms; an oscillating member adapted to alternately throw the radius bars, and having a dog to engage the said notched arms; a link having a pin normally obstructing said dog; a guard plate to normally prevent action of the dog on the other radius bar, said guard plate engaged by said link; a total key connected to the latter; an elimination key and thrust rod engaged with the guard plate; means for operating said thrust rod in every other reciprocation of the rack-bars, said means comprising a lever and connections to vibrate the same; a pivoted arm and connections for moving one set of wheels into and out of engagement with their racks; a cam-sector for operating said pivoted arm; a spring-held hook for restraining the latter; and a rod for displacing said hook connected to the aforesaid lever of the means for operating the thrust-rod.

44. In a machine of the character described, the combination of reciprocating bars carrying racks; wheels engageable with and disengageable from said racks; controlling devices comprising a link and radius bars with notched arms; an arm swinging between the radius bars and having a dog to act upon the notched arms; a guard plate for one of such arms; a total key and connections for releasing the dog and displacing the guard-plate; and a key for independently displacing the latter.

45. In a machine of the character described, the combination of reciprocating bars carrying racks; wheels engageable with and disengageable from said racks; controlling devices comprising a link and radius bars with notched arms; an arm swinging between the radius bars and having a dog to act upon the notched arms; a guard plate for one of such arms; a total key and connections for releasing the dog and displacing the guard-plate; a key for independently displacing the latter; and means for automatically displacing said guard plate in every other reciprocation of the rack-bars.

46. In a machine of the character described, the combination of reciprocating bars carrying racks; wheels engageable with and disengageable from said racks; controlling devices comprising a link and radius bars with notched arms; an arm swinging between the radius bars and having a dog to act upon the notched arms; a guard plate for one of such arms; a total key and connections for releasing the dog and displacing the guard-plate; a key for independently displacing the latter; printing mechanism; a laterally shiftable paper carriage; means for shifting the same first one way and then the other between printing operations; and means for automatically displacing the guard-plate in every other shift of the carriage.

47. In a machine of the character described, the combination of reciprocating bars carrying racks; wheels engageable with and disengageable from said racks; controlling devices comprising a link and radius bars with notched arms; an arm swinging between the radius bars and having a dog to act upon the notched arms; a guard plate for one of such arms; a total key and connections for releasing the dog and displacing the guard-plate; a key and thrust-rod for independently displacing the latter; printing mechanism; a laterally shiftable paper carriage; means for shifting the same first one way and then the other between printing operations, said means including a vibrating arm; a bell-crank lever; a link connecting the same to said arm; a lever engaging the aforesaid thrust-rod; and a link connecting said last-mentioned lever with the bell-crank-lever.

48. In a machine of the character described, the combination of reciprocating bars carrying racks; wheels engageable with and disengageable from said racks; controlling devices comprising a link and radius bars with notched arms; an arm swinging between the radius bars and having a dog to act upon the notched arms; a guard plate for one of such arms; a total key and connections for releasing the dog and displacing the guard-plate; a key and thrust-rod for independently displacing the latter; printing mechanism; a laterally shiftable paper carriage; means for shifting the same first one way and then the other between printing operations, said means including a vibrating arm; a bell-crank lever; a link connecting the same to said arm, being slotted to embrace a stud on the latter and connected therewith by a spring; a manipulative member adapted to engage said link to block its movement; a lever engaging the aforesaid thrust-rod; and a link connecting said last-mentioned lever with the bell-crank lever 49. In a machine of the character described, the combination of reciprocating bars carrying racks; a set of pinions on a support movable to engage said pinions with and disengage them from said racks; an arm or lever having a roller; operating connections between said arm and said support with lost-motion provisions; and a rocking sector having a cam-strip to engage said roller and carrying a pivoted spring-held finger with a stud to engage the said arm when said sector rocks one way and tension the spring to force the roller past the cam-strip; substantially as and for the purpose described.

50. In a machine of the character described, the combination of reciprocating bars carrying racks; a set of pinions on a support movable to engage said pinions with and disengage them from said racks; a cam-segment engaging the journal of said wheel; a bell-crank lever; a link connecting the same with said cam-segment: an arm or lever having a roller; a link connected to said arm and slotted to embrace a stud on the bell-crank lever; and a rocking sector having a cam-strip to engage said roller and carrying a pivoted spring-held finger with a stud to engage the said arm when said sector rocks one way and tension the spring to force the roller past the cam-strip; substantially as and for the purpose described.

51. In a machine of the character described, the combination of reciprocating bars carrying racks; a set of pinions on a support movable to engage said pinions with and disengage them from said racks; an arm or lever having a roller; operating connections between said arm and said support with lost-motion provisions; a rocking sector having a cam-strip to engage said roller and carrying a pivoted spring-held finger with a stud to engage the said arm when said sector rocks one way and tension the spring to force the roller past the cam-strip; and a total key lever adapted to shift said arm and block the said finger.

52. In a machine of the character described, the combination of reciprocating bars carrying racks; a set of pinions on a support movable to engage said pinions with and disengage them from said racks; an arm or lever having a roller; operating connections between said arm and said support with lost-motion provisions; a rocking sector having a cam-strip to engage said roller and carrying a pivoted spring-held finger with a stud to engage the said arm when said sector rocks one way and tension the spring to force the roller past the cam-strip; a spring-held slide-piece on the arm and having a raised edge; and a total key lever having a stud engaging the latter, the slide-piece arranged to be displaced by the stud on the finger so as to permit the arm to shift; substantially as and for the purpose described.

53. In a machine of the character described, the combination of reciprocating bars carrying racks; a set of pinions on a support movable to engage said pinions with and disengage them from said racks; an arm or lever having a roller; operating connections between said arm and said support with lost-motion provisions; a rocking sector having a cam-strip to engage said roller and carrying a pivoted spring-held finger with a stud to engage the said arm when said sector rocks one way and tension the spring to force the roller past the cam-strip; a spring-held slide-piece on the arm and having a raised edge; and a total key lever having a stud engaging the latter, the slide-piece arranged to be displaced by the stud on the finger so as to permit the arm to shift; and the said slide-piece having an inclined edge for said stud to act against for enforcing movement of the arm.

54. In a machine of the character described, the combination of reciprocating bars; racks slidingly mounted thereon with limited movement and spring-drawn; detents engaging said racks to prevent movement thereof by their springs; pinions having transfer projections; a support for said pinions movable to engage them with and disengage them from the racks and having arms to act on the racks; and pawls engaged by the transfer projections and adapted to engage and displace the detents; substantially as and for the purpose described.

55. In a machine of the character described, the combination of reciprocating bars; racks slidingly mounted thereon with limited movement and spring-drawn; detents engaging said racks to prevent movement thereof by their springs; pinions having transfer projections; a swinging bail in which said pinions are journaled; a rock shaft to which the bail is secured; arms secured to said rock shaft and extending behind the racks respectively; and pawls engaged by the transfer projections and adapted to engage and displace the detents; substantially as and for the purpose described.

56. In a machine of the character described, the combination of adding and printing mechanisms; a prime mover; a reciprocating member actuated from the latter to shift first one way and then the other in successive operations thereof; and a paper carriage adapted to be united with said reciprocating member at one or another lateral position at will.

57. In a machine of the character described, the combination of adding and printing mechanism; a prime mover; a notched-bar actuated from the latter to shift first one way and then the other in successive operations thereof; and a paper carriage having a dog engageable with one or another notch of the bar.

58. In a machine of the character described, the combination of adding and printing mechanisms; a prime mover; a notched-bar actuated from the latter to shift first one way and then the other in successive operations thereof; a paper carriage; a rock-rod thereon having means for fixing the carriage at various lateral positions and having a radial projection; a turn piece engaging the latter; and a dog journaled on said rod and adapted to engage one or another notch of the bar and having a handle engaging the said turn-piece.

59. In a machine of the character described, the combination of adding and printing mechanisms; a prime mover; a reciprocating member actuated from the latter to shift first one way and then the other in successive operations thereof; a paper carriage adapted to be united with said reciprocating member at one or another lateral position at will; and manipulative means for fixing the carriage at various lateral positions, said means disabled as an accompaniment to uniting the carriage with the reciprocating member.

60. In a machine of the character described, the combination of adding and printing mechanisms; a prime mover; a reciprocating member actuated from the latter to shift first one way and then the other in successive operations thereof; a paper carriage reciprocated by said member; line-spacing means comprising a bail and vibrating spring-held arms engaging the same; and an arm movable into and out of line with said bail and shifted by the reciprocating member; substantially as and for the purpose described.

61. In a machine of the character described, the combination of adding and printing mechanisms; a prime mover; a reciprocating member actuated from the latter to shift first one way and then the other in successive operations thereof; a paper carriage reciprocated by said member; line-spacing means comprising a bail and vibrating spring-held arms engaging the same, an arm movable into and out of line with said bail and shifted by the reciprocating member; and a manipulative member for holding said arm indefinitely out of line with the bail.

62. In a machine of the character described, the combination of adding and printing mechanisms; a prime mover; a reciprocating member actuated from the latter to shift first one way and then the other in successive operations thereof; a paper carriage reciprocated by said member; line spacing mechanism; and means for disabling the same said means adapted to be disabled by said reciprocating member but adjustable so as to be unaffected thereby.

63. In a machine of the character described, the combination of adding and printing mechanisms; a prime mover; a reciprocating member actuated from the latter to shift first one way and then the other in successive operations thereof; a paper carriage reciprocated by said member; line-spacing means comprising a bail and vibrating spring-held arms engaging the same; an arm movable into and out of line with said bail and spring-actuated into line therewith; and a second arm engaged with the first and adapted to be acted upon by said reciprocating member to shift the first mentioned arm out of line with the bail, said second mentioned arm being adjustable to a position where it will not be so acted upon.

FRANK C. RINSCHE.

Witnesses:
WARREN L. HOAGLAND,
W. G. PAUSCH.

---

Correction in Letters Patent No. 1,114,914.

It is hereby certified that in Letters Patent No. 1,114,914, granted October 27, 1914, upon the application of Frank C. Rinsche, of St. Louis, Missouri, for an improvement in "Adding and Listing Machines," an error appears in the printed specification requiring correction as follows: Page 20, strike out line 85; and that the said Letters Patent should be read with this correction therein that the same may conform to the record of the case in the Patent Office.

Signed and sealed this 24th day of November, A. D., 1914.

[SEAL.]

R. F. WHITEHEAD,

*Acting Commissioner of Patents.*